United States Patent
Allen

(10) Patent No.: US 11,093,270 B2
(45) Date of Patent: *Aug. 17, 2021

(54) FAST-BOOTING APPLICATION IMAGE

(71) Applicant: Amazon Technologies, Inc., Seattle, WA (US)

(72) Inventor: Nicholas Alexander Allen, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 9 days.

This patent is subject to a terminal disclaimer.

(21) Appl. No.: 15/697,191

(22) Filed: Sep. 6, 2017

(65) Prior Publication Data

US 2017/0364384 A1     Dec. 21, 2017

Related U.S. Application Data

(63) Continuation of application No. 15/152,448, filed on May 11, 2016, now Pat. No. 9,766,921, which is a
(Continued)

(51) Int. Cl.
*G06F 9/455* (2018.01)
*G06F 9/4401* (2018.01)
(Continued)

(52) U.S. Cl.
CPC .......... *G06F 9/45558* (2013.01); *G06F 3/065* (2013.01); *G06F 3/067* (2013.01);
(Continued)

(58) Field of Classification Search
None
See application file for complete search history.

(56) References Cited

U.S. PATENT DOCUMENTS

| 5,555,385 A | 9/1996 | Osisek |
| 5,887,168 A | 3/1999 | Bahls et al. |

(Continued)

FOREIGN PATENT DOCUMENTS

| CN | 102270104 A | 12/2011 |
| JP | 2007506169 A | 3/2007 |

(Continued)

OTHER PUBLICATIONS

Erlang, "Erlang on Xen—at the heart of super-elastic clouds," retrieved Jul. 16, 2015, from erlangonxen.org/case/a-personal-facebook, 48 pages.
(Continued)

*Primary Examiner* — Eric C Wai
(74) *Attorney, Agent, or Firm* — Davis Wright Tremaine LLP

(57) ABSTRACT

A method and apparatus for configuring an overlay network are provided. In the method and apparatus, an application source comprising an executable portion is obtained. A computer system instance is caused to execute at least some of the executable portion, and a snapshot of the computer system instance after partial but incomplete execution of the executable portion is obtained such that the snapshot is usable to instantiate another computer system instance to continue execution of the executable portion from a point in execution at which the snapshot was obtained.

21 Claims, 15 Drawing Sheets

Related U.S. Application Data continuation of application No. 13/964,941, filed on Aug. 12, 2013, now Pat. No. 9,348,634.

(51) Int. Cl.
| | |
|---|---|
| *G06F 3/06* | (2006.01) |
| *G06F 8/61* | (2018.01) |
| *G06F 8/71* | (2018.01) |

(52) U.S. Cl.
CPC .......... *G06F 3/0619* (2013.01); *G06F 9/4401* (2013.01); *G06F 9/4406* (2013.01); *G06F 8/63* (2013.01); *G06F 8/71* (2013.01); *G06F 2009/45562* (2013.01); *G06F 2009/45583* (2013.01)

(56) References Cited

U.S. PATENT DOCUMENTS

| | | | |
|---|---|---|---|
| 6,678,735 | B1 | 1/2004 | Orton et al. |
| 6,957,113 | B1 | 10/2005 | Logsdon et al. |
| 7,340,679 | B2 | 3/2008 | Botscheck et al. |
| 7,512,769 | B1 | 3/2009 | Lowell et al. |
| 8,171,495 | B2 | 5/2012 | Allen et al. |
| 8,225,317 | B1 | 7/2012 | Chiueh et al. |
| 8,301,706 | B2 | 10/2012 | Paramasivam et al. |
| 8,375,095 | B2 | 2/2013 | Yurkovich et al. |
| 8,738,932 | B2 | 5/2014 | Lee et al. |
| 2001/0054057 | A1* | 12/2001 | Long ................ G06F 9/52 718/108 |
| 2002/0116205 | A1 | 8/2002 | Ankireddipally et al. |
| 2002/0141404 | A1 | 10/2002 | Wengrovitz |
| 2003/0093499 | A1 | 5/2003 | Messinger et al. |
| 2003/0154112 | A1 | 8/2003 | Neiman et al. |
| 2003/0236848 | A1 | 12/2003 | Neiman et al. |
| 2003/0237084 | A1 | 12/2003 | Neiman et al. |
| 2004/0015968 | A1 | 1/2004 | Neiman et al. |
| 2004/0194086 | A1* | 9/2004 | Suzaki ................ G06F 9/4856 718/100 |
| 2004/0205776 | A1 | 10/2004 | Harrington et al. |
| 2005/0060237 | A1 | 3/2005 | Barsness et al. |
| 2006/0143595 | A1 | 6/2006 | Dostert et al. |
| 2006/0155894 | A1 | 7/2006 | Pennington |
| 2007/0124363 | A1 | 5/2007 | Lurie et al. |
| 2007/0250335 | A1 | 10/2007 | Hodges et al. |
| 2008/0127114 | A1* | 5/2008 | Vasudevan ............ G06F 21/566 717/129 |
| 2009/0077011 | A1 | 3/2009 | Natarajan et al. |
| 2009/0133036 | A1 | 5/2009 | Allen et al. |
| 2009/0133037 | A1 | 5/2009 | Allen et al. |
| 2009/0199208 | A1 | 8/2009 | Pinto et al. |
| 2009/0228329 | A1 | 9/2009 | Asanuma |
| 2009/0288084 | A1 | 11/2009 | Astete et al. |
| 2009/0300210 | A1 | 12/2009 | Ferris |
| 2010/0107177 | A1 | 4/2010 | Pinto et al. |
| 2010/0191705 | A1 | 7/2010 | Barabas et al. |
| 2010/0211946 | A1 | 8/2010 | Elzur |
| 2010/0268764 | A1 | 10/2010 | Wee et al. |
| 2011/0004701 | A1 | 1/2011 | Panda et al. |
| 2011/0153999 | A1 | 6/2011 | Borin et al. |
| 2012/0060165 | A1 | 3/2012 | Clarke |
| 2012/0144232 | A1 | 6/2012 | Griffith et al. |
| 2012/0233282 | A1 | 9/2012 | Voccio et al. |
| 2012/0260250 | A1 | 10/2012 | Maeda et al. |
| 2012/0311572 | A1 | 12/2012 | Falls |
| 2013/0067469 | A1 | 3/2013 | Das et al. |
| 2013/0145362 | A1 | 6/2013 | Dawson et al. |
| 2013/0198743 | A1 | 8/2013 | Kruglick |
| 2013/0212598 | A1 | 8/2013 | Doitch |
| 2013/0275948 | A1 | 10/2013 | Bates et al. |
| 2013/0283266 | A1 | 10/2013 | Baset et al. |
| 2014/0059226 | A1 | 2/2014 | Messerli et al. |
| 2014/0237151 | A1 | 8/2014 | Jacobs et al. |
| 2014/0282501 | A1 | 9/2014 | Zeng et al. |
| 2016/0034299 | A1 | 2/2016 | Arges et al. |

FOREIGN PATENT DOCUMENTS

| | | |
|---|---|---|
| JP | 2010271980 A | 12/2010 |
| JP | 2011145912 A | 7/2011 |
| WO | 2012047451 A1 | 4/2012 |

OTHER PUBLICATIONS

Haskell, "The Haskell Lightweight Virtual Machine (HaLVM):GHC Running on Xen," GitHub, Inc., USA, retrieved Jul. 16, 2015, from github.com/GaloisInc/HaIVM, 100 pages.

International Search Report and Written Opinion dated Nov. 12, 2014, International Patent Application No. PCT/US2014/050597, filed Aug. 11, 2014.

Madhavapeddy et al., "MIRAGE OS 1.0," released Dec. 2013, followed by Mirage OS in Jul. 2014, retrieved on Jul. 16, 2015, from mirage.io/, 184 pages.

Madhavapeddy et al., "Unikernels: Library Operating Systems for the Cloud," ACM SIGPLAN Notices, Apr. 23, 2013, p. 461, retrieved from the internet on Feb. 2, 2017, at anil.recoil.org/papers/2013-asplos-mirage.pdf, 12 pages.

Tichy, "A Catalogue of General-Purpose Software Design Patterns," Technology of Object-Oriented Languages and Systems, IEEE, Jul. 28, 1997, pp. 330-339.

Wick, "The HaLVM: A Simple Platform for Simple Platforms," XenSummit, Aug. 27, 2012, 22 pages.

Zhao et al., "Reducing the Delay and Power Consumption of Web Browsing on Smartphones in 3G networks," 2011 31st International Conference on Distributed Computing Systems, IEEE, Jun. 20, 2011, pp. 413-422.

Chinese Second Office Action dated Apr. 3, 2019, Patent Application No. 201480052085.6, filed Aug. 11, 2014, 3 pages.

Japanese Final Rejection dated Jul. 3, 2019, Patent Application No. 2018-191339, filed Aug. 11, 2014, 2 pages.

Japanese First Office Action dated Feb. 10, 2020, Patent Application No. 2019-201248, filed Aug. 11, 2014, 5 pages.

Canadian Office Action dated Dec. 18, 2017, Patent Application No. 2921180, filed Aug. 11, 2014, 3 pages.

Canadian Office Action dated Nov. 14, 2018, Patent Application No. 2921180, filed Aug. 11, 2014, 4 pages.

Chinese First Office Action dated May 30, 2018, Patent Application No. 201480052085.6, filed Aug. 11, 2014, 8 pages.

European Communication pursuant to Article 94(3) EPC dated Jan. 25, 2019, Patent Application No. 14836658.6, filed Aug. 11, 2014, 5 pages.

European Communication pursuant to Article 94(3) EPC dated Nov. 6, 2017, Patent Application No. 14836658.6, filed Aug. 11, 2014, 6 pages.

Japanese First Office Action dated Feb. 4, 2019, Patent Application No. 2018-191339, filed Aug. 11, 2014, 3 pages.

Japanese Notice of Grant dated Sep. 10, 2018, Patent Application No. 2016-533499, filed Aug. 11, 2014, 3 pages.

Japanese Office Action dated Jun. 4, 2018, Patent Application No. 2016-533499, filed Aug. 11, 2014, 3 pages.

Canadian Office Action dated Jan. 24, 2020, Patent Application No. 2921180, filed Aug. 11, 2014, 3 pages.

Chinese Notice on Grant of Patent Right for Invention dated Dec. 19, 2019, Patent Application No. 201480052085.6, filed Aug. 11, 2014, 4 pages.

Indian First Examination Report dated Feb. 11, 2020, Patent Application No. 201617004639, filed Aug. 11, 2014, 7 pages.

European Communication under Rule 71(3) EPC dated Jul. 27, 2020, Patent Application No. 14836658.6, 69 pages.

Japanese Decision to Grant a Patent dated Aug. 17, 2020, Patent Application No. 2019-201248, 3 pages.

Japanese Office Action dated Oct. 6, 2020, Patent Application No. 2018-191339, 4 pages.

Canadian Office Action dated Dec. 8, 2020, Patent Application No. 2921180, 3 pages.

(56) References Cited

OTHER PUBLICATIONS

European Communication under Rule 71(3) EPC dated Jan. 14, 2021, Patent Application No. 14836658.6, 70 pages.

* cited by examiner

FAST-BOOTING APPLICATION IMAGE

CROSS-REFERENCE TO RELATED APPLICATIONS

This application is a continuation of U.S. application Ser. No. 15/152,448, filed May 11, 2016, entitled "FAST-BOOTING APPLICATION IMAGE USING VARIATION POINTS IN APPLICATION SOURCE CODE", which is a continuation of U.S. application Ser. No. 13/964,941, filed Aug. 12, 2013, entitled "FAST-BOOTING APPLICATION IMAGE USING VARIATION POINTS IN APPLICATION SOURCE CODE," which incorporates by reference for all purposes the full disclosure of U.S. patent application Ser. No. 13/964,889, filed Aug. 12, 2013, entitled "REQUEST PROCESSING TECHNIQUES" and U.S. patent application Ser. No. 13/964,977, filed Aug. 12, 2013, entitled "PER REQUEST COMPUTER SYSTEM INSTANCES."

BACKGROUND

The servicing of electronic requests can require varying amounts of resources. Request service, for instance, can range in scale from tiny, stateless computations to long-running massively parallel applications. The servicing of requests often requires only a limited amount of computing resources, often much less than the computer systems used to service the requests have available. As a result, computing resources often go underutilized and, generally, conventional techniques for processing requests have numerous inefficiencies. Virtualization, in many regards, has improved the way computing resources are utilized by, for instance, allowing a single physical computer system to implement multiple simultaneously operating virtual computer systems, thereby providing resizable capacity that makes it easy for a developer to elastically scale upwards.

Conventional virtualization techniques, however, are subject to fundamental limitations on the ability of a developer to scale compute downwards due to the resources required to service a request and the amortization of costs for spinning up and tearing down a virtual computer system (instance). Practical implementations of service virtualization generally rely on an expectation that the workload will have a tenancy of minutes, hours, or even longer. For example, with many applications, a virtual computer system may be used relatively infrequently. To have the virtual computer system able to service requests, however, the virtual computer system must be maintained in an operational state, which requires computing resources for the computer system's operating system and other resources (e.g., network resources). When such computer systems are underutilized, at least some of resources allocated to those computer systems are generally unavailable for other uses.

BRIEF DESCRIPTION OF THE DRAWINGS

Various embodiments in accordance with the present disclosure will be described with reference to the drawings, in which.

DETAILED DESCRIPTION

Figure 1:
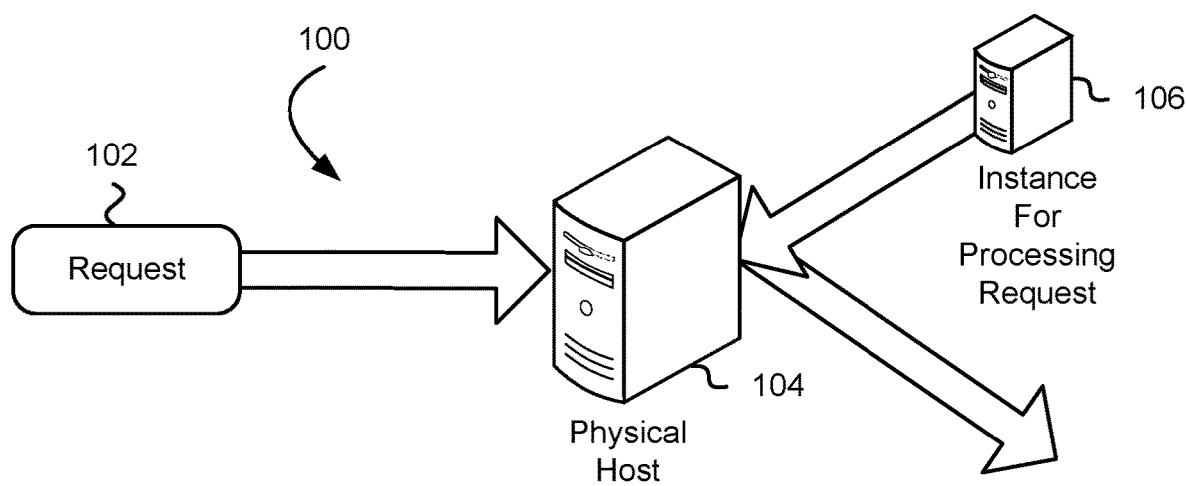
FIG. 1 shows an illustrative example of a diagram illustrating various aspects of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to preparation of images to be used to instantiate virtual computer systems. In various embodiments, the virtual computer systems are configured to enable numerous technical advantages, such as quicker boot times, reduced computational overhead and the resulting ability to implement a greater number of virtual machines using a physical computing device (host computer system). In addition, as described below, various techniques are used to further enhance such advantages.

In an embodiment, application code is processed to generate an application image that can be used to instantiate a virtual machine instance. Application source may be received by a build system. The application source may be submitted by a developer through, for example, a web service application programming interface (API) or a version control system. The application source may include source files, configuration files, resource files (such as web pages, graphic images or other media files), binary files and/or other information. The build system may process the application, parsing the application to produce an annotated source. Processing the application may include examining an executable portion of the application source to determine one or more locations at which execution may first begin to vary in the program. Further, processing the application may include creating annotations for the application source. The annotations may be generated by identifying one or more entry points for executing the application source. The entry points may be determined by parsing, interpreting or otherwise analyzing the application source beginning from the one or more entry points until a potential variation is detected, that is a point in execution where execution may vary for different executions of the application.

Once the annotated application source has been generated, the build system may transmit the annotated source to a build controller implemented by a build hypervisor. The build controller may access a build bootstrap program, which may be configured to boot a kernel for the annotated source. The bootstrap program may include routines to read the kernel and annotated source into memory. The bootstrap program may include routines to set breakpoints at the determined variation locations in the annotated source. The bootstrap program may include routines to begin executing the kernel from a kernel entry point.

The build controller may create a build instance based at least in part on the annotated source and build bootstrap program. The build instance may be created by instantiating a virtual machine (virtual computer system) from which the annotated source and bootstrap program may be accessible. The application may be executed until a variation point is reached. Reaching the variation point may result in execution of the application being halted. If necessary, execution of the application may be adjusted to a safe point, which may correspond to a point in application execution where a snapshot of the state of the virtual machine executing the application can be used as a starting point for execution of the application at a later time on the same or a different physical computer system.

Accordingly, in various embodiments, a snapshot of the virtual machine is stored for later use. The snapshot may include an entry point address at which execution of the application can resume. The snapshot may be placed in a repository of application images accessible by the worker hypervisor and/or one or more other worker hypervisors. A worker hypervisor may retrieve an application image from the repository of application images and resume execution of the application at the entry point address. In this manner, invariant portions of application execution are processed before the application is loaded and used. As a result, the application can be loaded and used to process requests more quickly than if the invariant part of the application's execution was processed each time the application was loaded onto a computer system.

FIG. 1 shows a diagram illustrating various embodiments of the present disclosure. As illustrated, application source 102 is processed by a build machine 104, which may be a virtual machine configured to execute application instructions and halt execution of the application's execution when a variation point is detected. The build machine may be snapshotted at the variation point or a safe point near the variation point to generate an application boot image 106 which, as noted above and described in more detail below, can be used to instantiate a virtual machine used to process requests.

Figure 2:
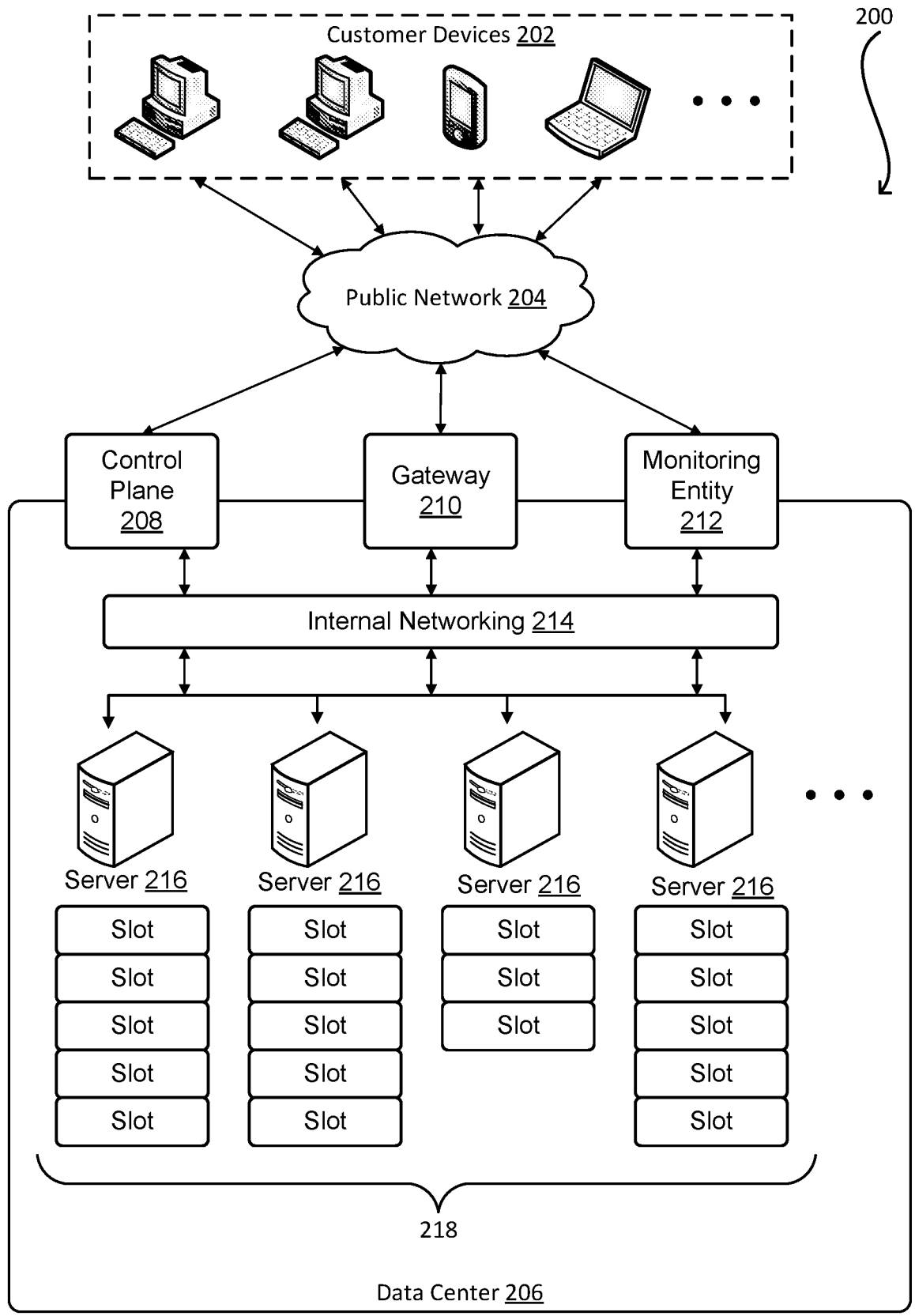
FIG. 2 shows an illustrative example of an environment in which various embodiments can be implemented.

As may be appreciated, and as previously mentioned, a physical host may be among a plurality of servers interconnected in a distributed computing system and/or datacenter. FIG. 2 illustrates a distributed computing and/or datacenter environment 200 in which various embodiments may be exercised. A plurality of customer devices 202 communicates via public network 204 to datacenter 206. The customer devices may include any devices capable of connecting via a public or other network to the data center, such as personal computers, smartphones, tablet computing devices, and the like. In an exemplary embodiment, the public network may be the Internet, although other publicly accessible networks (such as mobile and/or wireless networks) are contemplated herein. Further, while a public network 204 is used for the purpose of illustration, other networks and/or combinations of networks, which are not necessarily public, may be used. In some instances, customer devices may communicate to the data center 206 through a direct fiber optic or other connection (e.g., via a leased line to the data center 206). The datacenter 206 includes one or more management components, including but not limited to a control plane 208, a gateway 210 and/or a monitoring entity 212, which are collectively connected via internal networking 214 to a plurality of internal servers 216. The control plane 208 may receive requests to manipulate computing resources of the datacenter, such as provisioning resources, altering routing or performing maintenance, including updates to code running on various components of the datacenter. The gateway 210 may filter and route traffic in and out of the datacenter, such as to and/or from the servers via the internal networking. The monitoring entity may receive and report information about the status of computing resources in the data center, such as information about the internal servers.

Each internal server may be shared by multiple logical machine slots 218, each slot capable of running one or more applications, such as described below, such as would be the case in a virtualization system that abstracts the hardware of a given server into a plurality of semi-independent execution environments. For example, each slot may have access to one or more virtual processors (VCPUs). Any number of the plurality of the customer devices previously described may run any number of guest operating systems or guest applications without operating systems in any number of slots, up to the limits of the datacenter (whether physical, logical or externally imposed), and the slots are allocated to the customers according to one or more of several operational and/or business-related criteria, such as geographical proximity, level of support and/or resources allocated to the user, server and/or slot health and/or readiness, and the like. Thus, the techniques described at least in connection with FIG. 1 may be scaled and/or adapted to provide efficient request processing.

Figure 3:
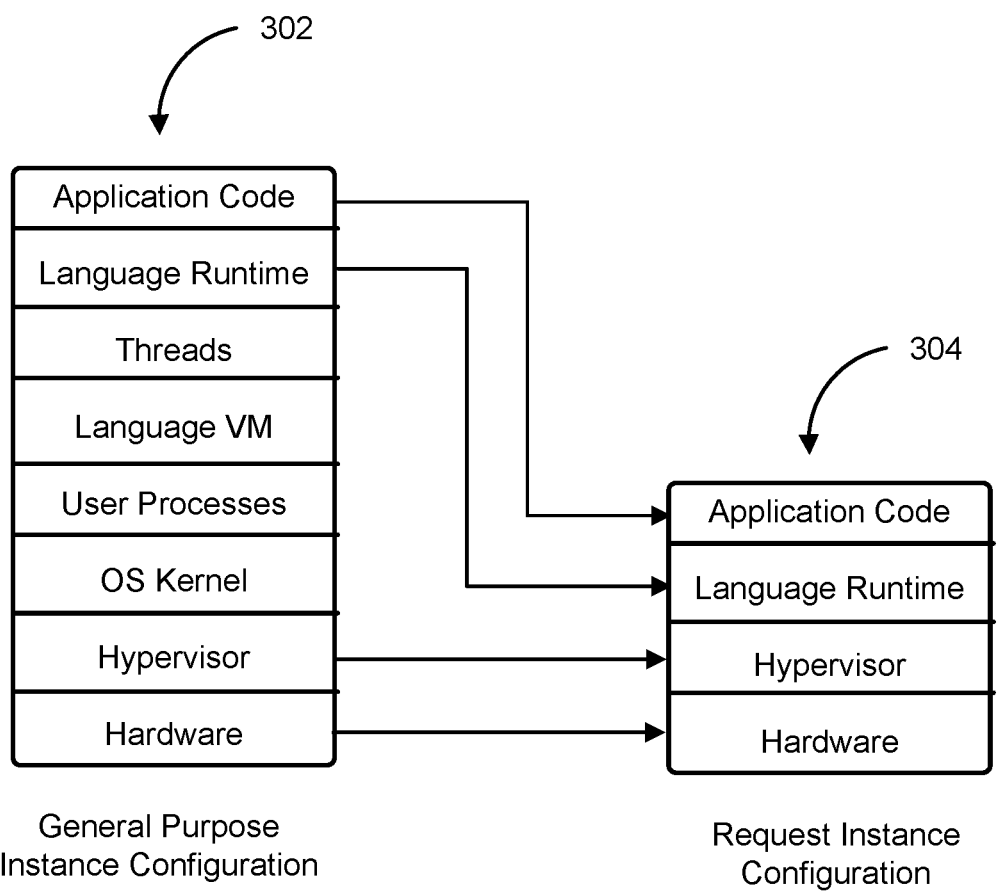
FIG. 3 shows an illustrative diagram comparing general purpose computer system instances with request instances.

As discussed, various embodiments of the present disclosure employ techniques that allow for numerous technical advantages in connection with processing requests, such as more efficient use of computing resources and reduced latency. FIG. 3, accordingly, shows an illustrative example of various techniques that may be employed to achieve certain advantages. As illustrated in the figure, a general purpose instance configuration 302 (instance) as instantiated by a physical computer system (physical host or physical host computer system). Also shown is a request instance configuration 304 (request instance) instantiated by a physical computer system as compared with the general purpose computer system.

As illustrated in FIG. 3, the general purpose instance is implemented using appropriate computer hardware including one or more central processing units (CPUs), volatile and/or non-volatile memory, network interface cards, and/or other computing resources. The hardware interfaces with a virtual machine monitor or hypervisor running directly on the hardware, e.g., a "bare metal" or native hypervisor.

Examples of such hypervisors include Xen, HyperV®, and the like. Hypervisors typically run at a higher, more privileged processor state than any other software on the machine, and provide services such as memory management and processor scheduling for dependent layers and/or domains. The most privileged of such layers and/or domains, in some embodiments referred to as dom0, resides in the service domain layer, which may include an administrative operating system for configuring the operation and functionality of the hypervisor, as well as that of domains of lower privilege, such as guest domains including guest operating systems and/or applications executing without traditional operating systems, such as described below. The guest domains may be heterogeneous (e.g., running different operating systems and/or applications than each other). The service domain may have direct access to the hardware resources of the server having a general purpose instance configuration 302 by way of the hypervisor, while the user domains may not.

For a particular virtual computer system, an operating system (OS) kernel, such as a Linux kernel, may interact with the hypervisor for the purpose of utilizing the various computing resources of the hardware. The OS kernel may, for instance, be configured to manage input/output (I/O) requests from one or more user processes by interacting with the virtualized hardware provided by the hypervisor. The user processes may implement a language virtual machine, which may be a virtual machine (VM) implemented logically inside of the general purpose instance for the purpose of implementing a particular corresponding programming language, such as a scripting language. The language VM may allow a language runtime to create one or more threads to enable its operation. Application code may utilize the language runtime for its operation (i.e., the hardware may operate in accordance with both the application code and the language runtime, where the application code may reference the language runtime).

Referring now to the request instance configuration 304, the request instance is implemented in a manner that reduces computing resource overhead. In particular, as with the general purpose instance configuration, the request instance is implemented using a hypervisor that virtualizes hardware resources. However, the request instance is implemented with the language runtime configured to be executed directly on top of the hypervisor instead of through the stack illustrated for the general purpose instance. In this manner, the overhead caused by millions of lines of code (relative to the general purpose instance) can be saved and utilized for other purposes.

Figure 4:
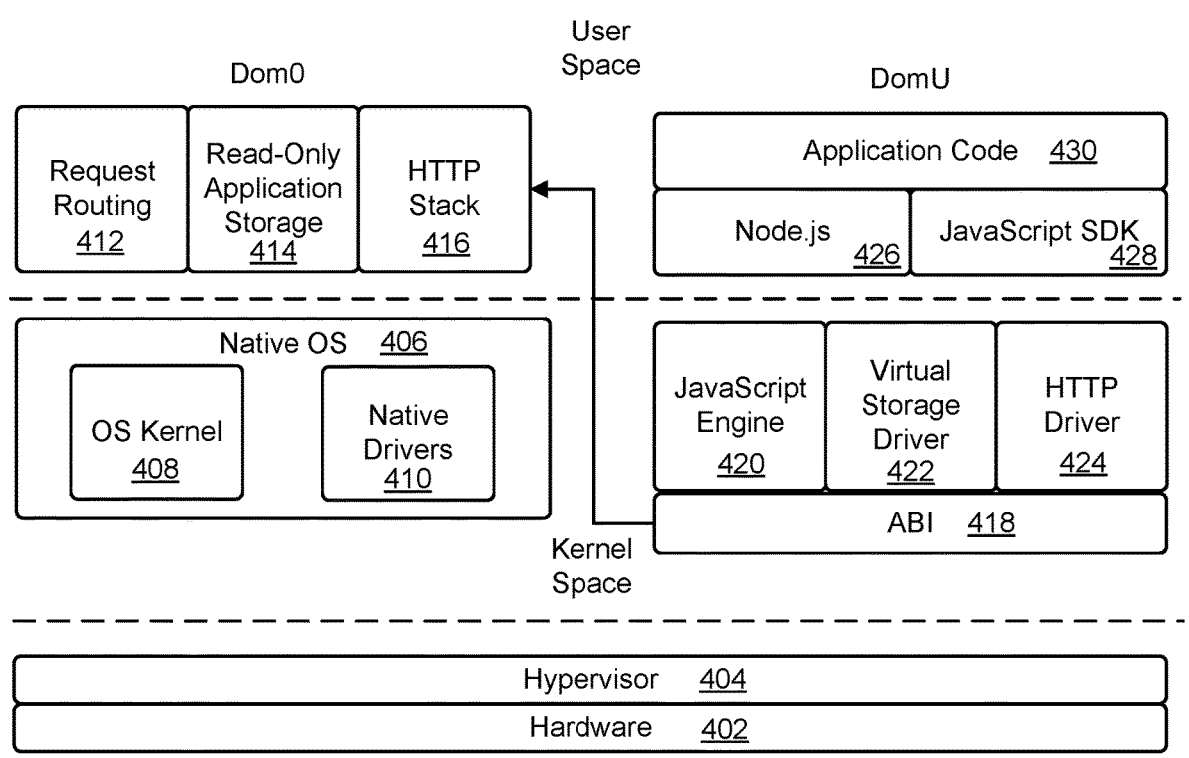
FIG. 4 shows an illustrative example of a configuration of a computer system that may be used to implement various embodiments of the present disclosure.

FIG. 4 shows an illustration of how such a configuration may be implemented in various embodiments. As illustrated, computer hardware 402 may be virtualized by a hypervisor 404, such as a Xen hypervisor. The hypervisor 404 may be used by a privileged, administrative domain, Dom0, and an unprivileged domain, DomU. In an embodiment, the Dom0 includes a native OS 406, which may include an OS kernel 408 (e.g., a Linux kernel) and native drivers 410 configured to enable application and OS interaction with the virtualized hardware provided by the hypervisor 404. The Native OS may support various administrative applications, such as request routing applications 412, read-only application storage 414, and an HTTP stack 416. As discussed below, the HTTP stack may be utilized by the DomU to enable operation of an application with less resource overhead. In some embodiments, some or all of the administrative functions may be performed by processes in separate stub domains that are unprivileged but that are operated by a service provider for the purpose of improving the security of the Dom0.

In an embodiment, the DomU is implemented with an application binary interface (ABI) 418 to the hypervisor 404 to utilize the HTTP Stack 416. For example, I/O may be provided using a split driver model that communicates with a real device driver stack through hypercalls. For instance, as noted in the figure, a Node.js HTTP module may provide http.createServer and http.request implementation using an HTTP driver of the Dom0 rather than building a TCP/IP stack against a virtual network adapter, which would require more overhead. As illustrated, in this illustrative example, a JavaScript engine 420, virtual storage driver 422, and HTTP driver 424 interact directly with the hypervisor 404 through the ABI 418, instead of through an intervening operating system. The JavaScript engine 420, virtual storage driver 422, and HTTP driver 424 provide support for a node.js platform 426 and JavaScript software development kit (SDK) 428, which, in turn, support application code 430 written in JavaScript. While JavaScript and supporting components are provided herein for the purpose of illustration, the scope of the present disclosure is not limited to the embodiments explicitly described herein. For example, the techniques described herein can be utilized with other scripting languages and, generally, for multiple types of application code.

Figure 5:
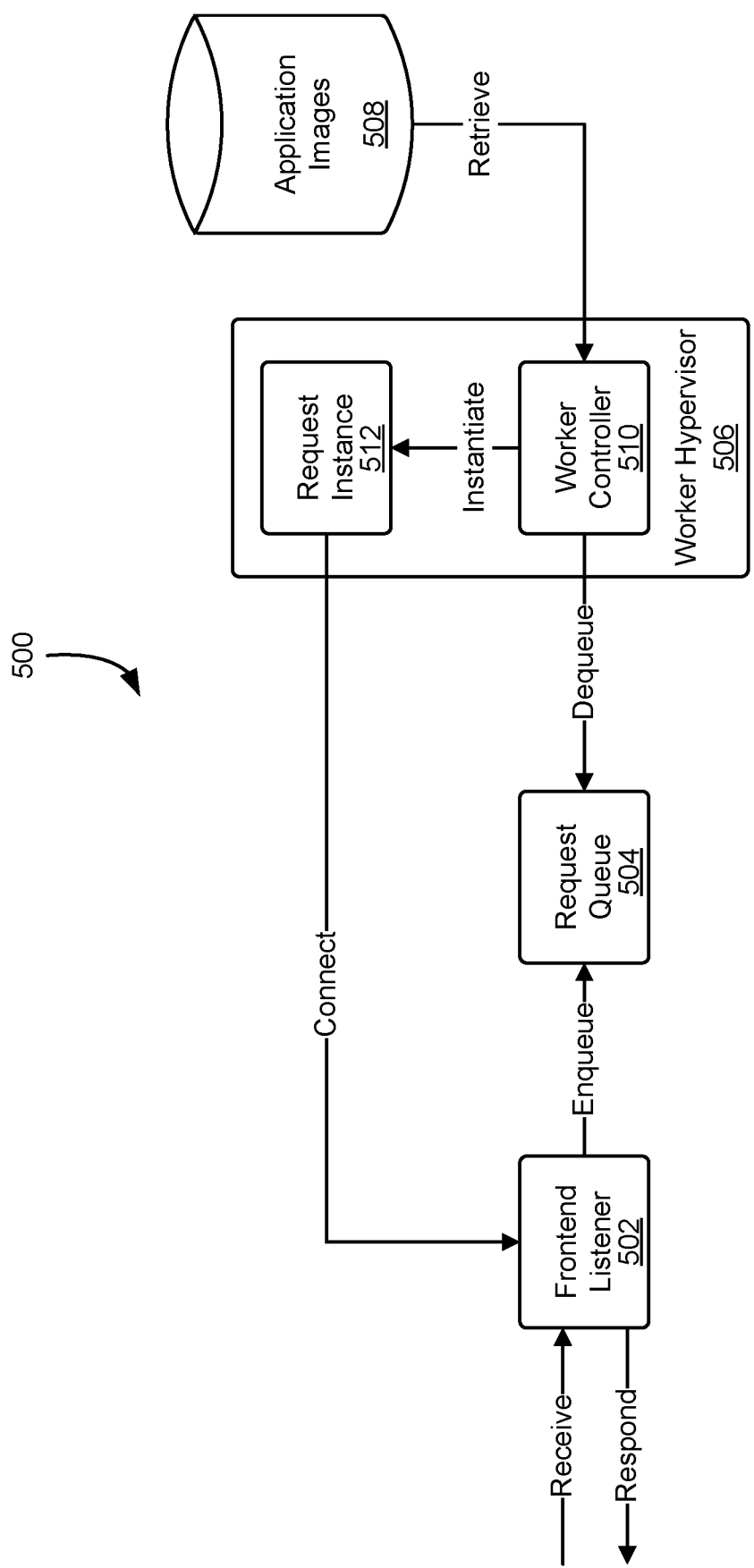
FIG. 5 shows an illustrative example of an environment in which various embodiments can be implemented.

FIG. 5 shows an illustrative example of an environment 500 in which various embodiments can be practiced. As illustrated in FIG. 5, the environment includes a frontend listener 502, a request queue 504, a worker hypervisor 506 and an application image repository 508. The components of the environment 500 may be implemented using a single physical computer system, although some components may be implemented on different computer systems that are able to communicate over a network. In an embodiment, the frontend listener is a computer system or a process executing thereon (i.e., instance of a computer program that is being executed) configured to listen for requests directed to a plurality of applications. For example, the frontend listener may be multiplexed to listen for requests at a variety of network addresses (e.g. public and/or private Internet protocol (IP) addresses) such as different hostnames, ports, and application paths. Application images usable to instantiate virtual computer systems may each have a corresponding network address so that, when a request addressed to a network address is received, the application image can be used to instantiate a virtual computer system that processes the request.

In some embodiments, the frontend listener 502 may include programming logic for validation to filter requests. For example, the frontend listener may be configured with an application registry service that indicates which network addresses correspond to valid applications. The frontend listener may also be configured to throttle or block improperly formatted requests, malicious requests or requests being received in excessive numbers. In some embodiments, the frontend listener 502 is configured with load balancing functionality. The frontend listener 502 may, for example, hash information in the request and/or associated with the request to determine a hash value which is used to determine which device to provide the work token (e.g., to determine which request queue to use). The frontend listener 502 may also distribute work tokens using one or more load balancing techniques, which may include distributing tokens based at least in part on the number of tokens present in each of a number of potential request queues.

The request queue 504 may be a data structure or programming module utilizing a queue data structure configured to store work tokens that correspond to requests received by the frontend listener and enqueued by the frontend listener. The frontend listener 502 may, for instance, be configured to construct a work token corresponding to the received request. The work token may include a process identifier, slot identifier, or other similar identifying information operable to associate the work token with a resumption point for continued handling of the request. The work token may include an application address based on the listening address or on address information contained within the request. The frontend listener may also enqueue the request work token by, for example, serializing the request work token to a message format and adding the serialized token to a message queue. In some embodiments request work tokens may be configured to have limited lifetimes. For example, the frontend listener may attach an expiration time to the request work token as part of enqueuing the request work token on the request queue. The request queue may be configured to automatically terminate or eject the request work token if the request is not satisfied within the expiration time.

The worker hypervisor 506, in an embodiment, is a hypervisor configured with the ability to instantiate request instances for the purpose of processing received requests. The worker hypervisor may operate within a competing consumer environment of a plurality of worker hypervisors. To perform its operations, the worker hypervisor 506 may be configured with a worker controller 510, which may be a process configured to process work tokens from the request queue 504. The worker controller may be implemented by a computing device different from a computing device that implements the frontend listener 502. The worker controller may be implemented in a privileged domain of the hypervisor (whereas any request instances implemented by the hypervisor may be implemented in less privileged/unprivileged domains.) Further, while the present disclosure uses a worker controller 510 for the purpose of illustration, the functions of the worker controller 510 may be distributed among multiple different processes. In other words, the worker controller 510 may refer to a collection of multiple processes. Generally, components illustrated herein, unless otherwise clear from context, can be implemented in various ways (e.g., by distributing responsibility for various functions among multiple different processes) and the scope of the present disclosure is not necessarily limited to the illustrative embodiments described explicitly herein. Returning to the illustrative example of FIG. 5. To dequeue a request from the request queue 504, the worker controller may obtain an exclusive, limited-time lease to the request work token without removing the request work token from the request queue. The request work token may automatically become available again or return to the request queue if the worker controller does not satisfy the request within a limited amount of time. In some embodiments, the worker controller 510 is configured to regulate the number of request tokens currently being processed. The worker controller 510 may, for instance, dequeue work tokens upon detecting available capacity for processing requests, while avoiding dequeuing work tokens while lacking additional capacity for request processing.

As another example, the worker controller 510 may be configured to retrieve an appropriate application image to perform the request from a repository of application images 508. The worker controller 510 may, for instance, determine an appropriate application image based at least in part on the request work token. For example, in some embodiments, the worker controller may parse the application address within the request work token as a URI, extract a portion of the URI for a request path, and consult a directory service to lookup an application image for the request path. In some embodiments, the worker controller 510 may consult a cache of application images (not pictured) already available at the worker hypervisor prior to accessing an external application image repository. The cache may be configured to enable faster access to application images than the application image repository 508. The cache may, for instance, be implemented in random access memory (RAM) whereas the application repository may utilize slower but more persistent storage, such as a hard drive with spinning magnetic media, a solid state drive or other device.

In various embodiments, the worker controller 510 is also configured to instantiate a request instance 512. The worker controller 510 may, as an example, be configured to interact with the worker hypervisor 506 to perform various operations such as, constructing a new user partition dedicated to the request instance, allocating processor, memory, or other resources to the user partition using a control application programming interface (API) on the worker hypervisor 506, constructing a shared memory region and directing the worker hypervisor 506 to map the shared memory region into the address space of the user partition as read-only memory. The worker controller 510 may also interact with a bootstrap program that is configured to copy at least a portion of the application image from the shared memory region into memory allocated to the user partition. The bootstrap program may, for instance, retrieve an entry point address (e.g., the address to which an instruction pointer pointed at the time of the snapshot used for the application image) associated with the copied portion of the application image from the shared memory region and may begin executing application code based on the entry point.

In addition, as noted above, the worker controller can utilize a work token to establish a logical connection with the corresponding request received by the frontend listener 502. In this manner, when application code in the request instance attempts to access the request, the worker controller 510 may locate the request work token associated with the request instance and establish a connection to the frontend listener identified by the request work token. The frontend listener, in turn, may be configured to listen for work connection requests from the request instance. The frontend listener may, for instance, be configured to locate the received request based on the identifying information included in the request work token. The frontend listener may also be configured to duplicate a socket handle used to receive the received request and may give the duplicated socket to the listener listening for work connection requests. The listener listening for work connection requests may read and write data using the duplicated socket in accordance with the request instance 512.

Figure 6:
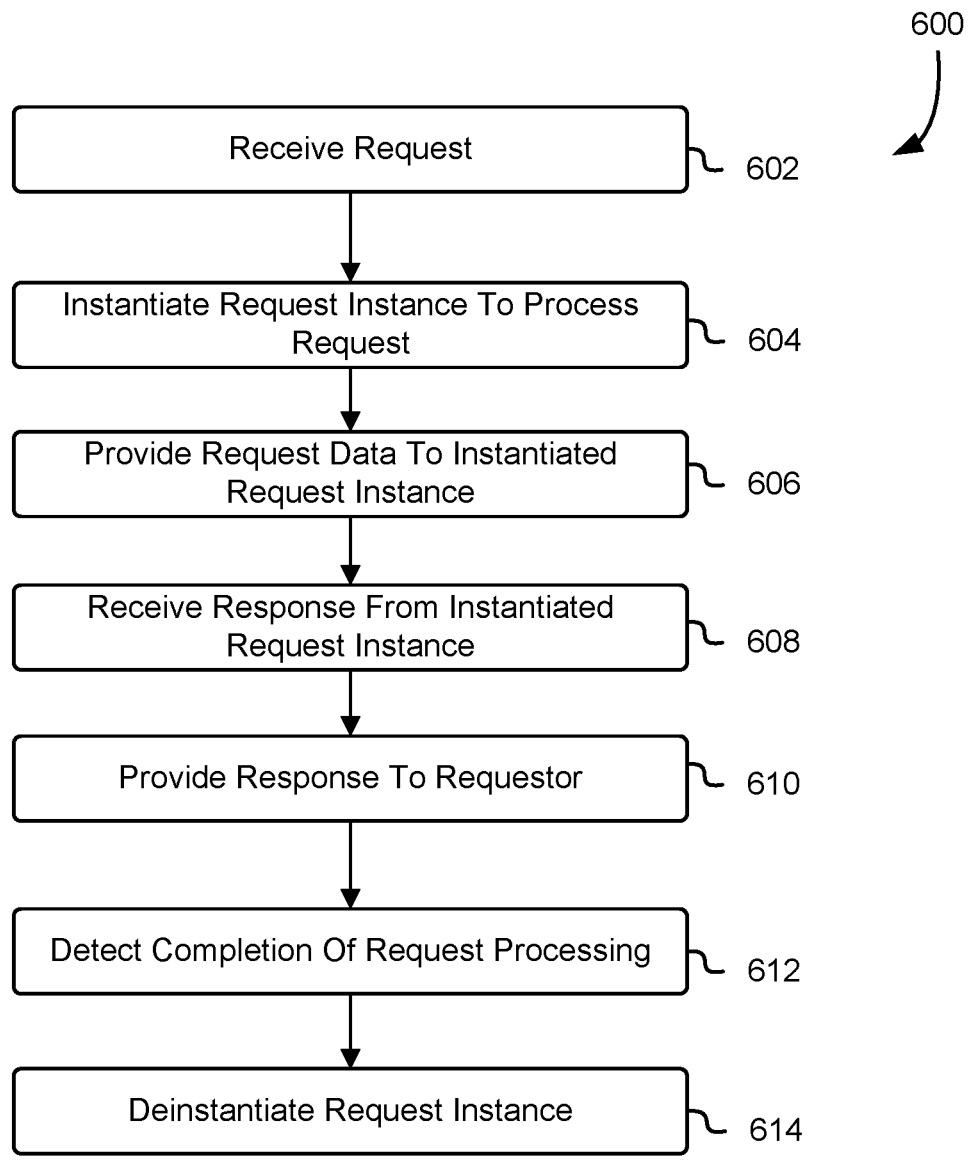
FIG. 6 shows an illustrative example of a process for processing a request in accordance with at least one embodiment.

FIG. 6 shows an illustrative example of a process 600 that may be used to respond to a request. Operations of the process 600 may be performed, for instance, by various components of the environment 500 discussed above in connection with FIG. 5, as discussed in more detail below. In an embodiment, the process 600 includes receiving 602 a request, which may be a request submitted by a user device over a network, such as described above. The request may be received, for instance, by a frontend listener, such as described above in connection with FIG. 5. A request instance may then be instantiated 604 to process the request.

A worker controller of a worker hypervisor may, for instance, access an application image from a cache or application image repository.

Once an appropriate request instance has been instantiated 604, the process 600 may include providing 606 request data to the instantiated request instance. The request data may include data to be processed by fulfilling the request and any metadata needed by the application of the instantiated request instance for processing the request. It should be noted that the request data may not be entirely contained in the request. For example, a request may be configured to initiate streaming of data, where the amount of data may be too large to fit within the request itself. In such instances, the request data may be provided in a streaming process to the request instance. Various techniques for providing request data to a request instance are discussed in more detail below.

Once the request instance has processed the request data that it was provided 606, the process 600 may include receiving 608 a response from the request instance. As discussed in more detail below, the request instance may place a response in a shared memory region shared both by the request instance and the worker controller. Further, as with the request data, data for a response may not be entirely contained in a single communication, but may involve more complex types of data transfer, such as streaming. Once the response to the request has been received 608, the process 600 may include providing 610 the response to the requestor (i.e., to the computer system that originally submitted the request) which may involve transmission of the response over a network to the requestor.

In various embodiments, when a request processing is completed by a request instance, the request instance may not be needed until another request satisfiable by the request instance is received. Accordingly, as illustrated in FIG. 6, the process 600 may include detecting 612 completion of request processing. For example, in some embodiments, receipt of the received response and/or dispatch of the response to the requestor triggers completion of request processing. In some embodiments, the request instance may remain operational for an amount of time which may end in various ways, such as by notification by the application operating in the request instance, the expiration of a timer and/or in other ways. In some examples, for instance, it may be desirable to leave a request instance operational to handle additional requests. Regardless of what triggers completion of request processing, the process 600 may include deinstantiation (i.e., deconfiguring) 614 the request instance so that computing resources reserved for the request instance become available for other purposes, such as for implementing additional request instances.

Figure 7:
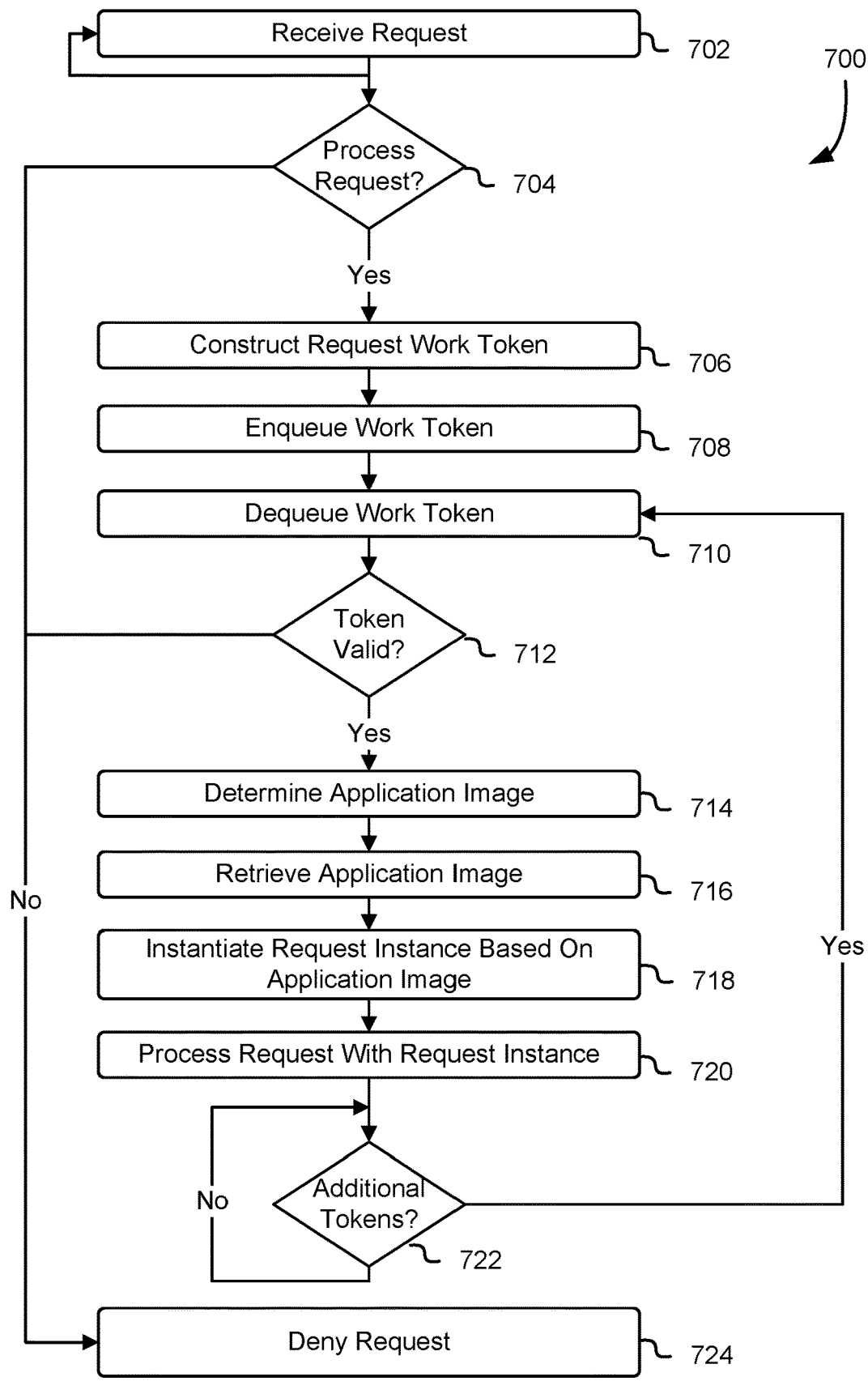
FIG. 7 shows an illustrative example of a process for processing a request in accordance with at least one embodiment.

FIG. 7 shows a more detailed example of a process 700 for processing requests in accordance with various embodiments. As with the process 600 described above in connection with FIG. 6, the process 700 may be performed by components of the environment 500, such as described in more detail below. In an embodiment, a request may be received 702, such as by a frontend listener. As indicated by the arrow looping from the box 702, a component that received the request may receive multiple requests before the processing of a given request has completed. Operations of the process 700 or a variation thereof may be performed for each such received request.

When a request is received 702, a determination may be made 704 whether to process the request. As noted above, a frontend listener that receives the request (or another component) may be configured with an application registry service that indicates which network addresses correspond to valid applications. As another example, the frontend listener or another component may be configured to throttle or block improperly formatted requests, malicious requests, or requests being received in excessive numbers. Accordingly, determining whether to process the request may be performed based at least in part on any criteria implemented by the frontend listener or another component operating in connection with performance of the process 700.

If determined 704 to process the request, the process 700 may include constructing 706 a request work token. The work token may, for example, be constructed by a frontend listener to include various information that enables association of the work token with the corresponding request. The work token may be constructed, for example, to include a process identifier, slot identifier, or other identifying information usable to associate the work token with a resumption point for continued handling of the request. The work token may also be constructed to include an application address based on the listening address or on address information contained within the request. Generally, the type and amount of information in a work token may vary in accordance with the various embodiments. It should be noted that, in some embodiments, the work token may be constructed asynchronously (e.g., before the request is received 702). The work token may be, for instance, pre-generated and associated with a request that is received and/or with other relevant information about the request.

Once constructed (or otherwise associated with the request), the process 700 may include enqueuing 708 the work token into a request queue, such as described above. The process 700 may also include dequeuing 710 a work token, which may be the oldest work token in the request queue, which may or may not be the same work token discussed above (although, as discussed above, the work token that was enqueued as discussed above may eventually be dequeued in accordance with repetition of portions of the process 700). The work token may be dequeued by a suitable component of a computer system, such as by a worker controller of a worker hypervisor. Further, as noted, dequeuing the work token may include obtaining, from the request queue, an exclusive, limited-time lease to the request work token without removing the request work token from the request queue so that the request work token may become available again if the worker controller does not satisfy the request within a limited amount of time (e.g., if the computer system implementing the work controller malfunctions during processing of the request). A determination may be made 712 whether the dequeued token is valid. For example, as discussed above, a token may include information indicating an expiration. Determining 712 whether the token is valid may include comparing an expiration time with a current time, where the token may be considered as invalid if the expiration time is before the current time. Other criteria may be checked in determining whether the token is valid.

If determined 712 that the token is valid, the process 700 may include determining 714 an application image appropriate for processing the request. For example, determining 714 the application image may be based at least in part on information associated with the token. The token may, for instance, include an identifier of an appropriate application or the application may otherwise be determined from the information of the request token. For example, determining the application may include parsing the application address within the request work token as a uniform resource identifier (URI), extracting a portion of the URI for a request path, and consult a directory service to look up an application image for the request path. As another example, information from the work token may be used to look up the appropriate application in a table or other data structure stored externally to the token and perhaps accessible over a network (e.g., via a web service request). Generally, any method of determining the application from the work token may be used.

When an appropriate application has been determined 714, the determined application may be retrieved 716. For example, the application image may be obtained from a local cache, a local data storage device, or an external location. In some embodiments, a worker controller checks a local cache for the application and, upon a cache miss, retrieves the application image from another location, such as from an external application image repository. Upon accessing the application image (or at least a portion thereof suitable for beginning processing the request), the process 700 may include using the retrieved application image to instantiate 718 a request instance, which may be configured such as described above in connection with FIGS. 3 and 4. For example, the worker controller may direct the worker hypervisor to instantiate a request instance based at least in part on the application image. For example, a worker controller may direct a worker hypervisor to construct a new user partition dedicated to the request instance and allocate processors, memory, or other resources to the user partition using a control API on the worker hypervisor. The worker controller may also construct a shared memory region including at least the application image and may direct the worker hypervisor to map the shared memory region into the address space of the user partition as read-only memory. Further, the worker controller may configure the user partition with a bootstrap program. The bootstrap program may be configured such that, when executed, at least a portion of the application image from the shared memory region is copied into memory allocated to the user partition. The bootstrap program may retrieve an entry point address associated with the copied portion of the application image from the shared memory region and may begin executing application code based on the entry point.

Upon instantiation 718 of the request instance, the request instance may be caused to process 720 the request. For example, the request instance may establish a connection with the request using the request work token, to obtain data from the request for processing, such as described in more detail below.

As illustrated in FIG. 7, the process 700 may include determining 722 whether there are additional work tokens to process, such as by querying a request queue or monitoring whether a notification of another token has been received from a request queue (if so configured to provide notifications). If it is determined that there is at least one or more work token in the request queue, the process 700 may include dequeuing 710 another work token and using the work token to process another request, such as described above. As indicated in the figure, if it is determined 722 that there are no additional tokens, the process 700 may include continuing to monitor for received work tokens so that future requests can be serviced.

When a request is received and it is determined 704 to not process the request or it is determined 712 that a token corresponding to the received request is not valid, the process 700 may include denying 724 the request. Denying the request may be performed in any suitable manner, such as by transmitting a message indicating the denial and/or a reason for the denial or by simply not providing a response.

Figure 8:
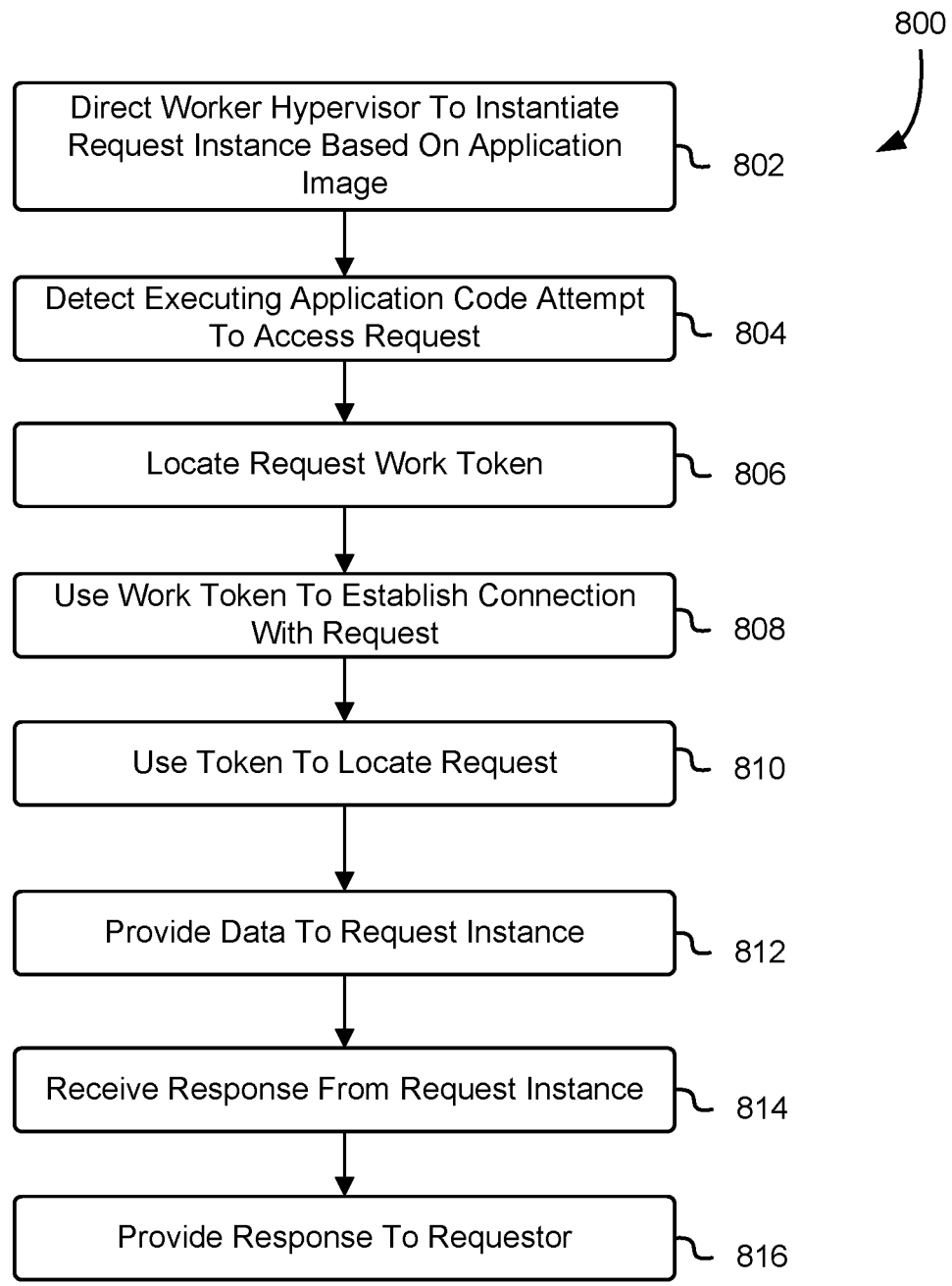
FIG. 8 shows an illustrative example of a process for processing a request in accordance with at least one embodiment.

FIG. 8 shows an illustrative example of a process 800 for processing a request, in accordance with various embodiments. The process 800 may be performed by any suitable system, such as one or more components of the environment 500 discussed above in connection with FIG. 5, as discussed in more detail below. In an embodiment, the process 800 includes directing 802 a worker hypervisor to instantiate a request instance based at least in part on an application image. Directing 802 the worker hypervisor to instantiate the request instance may be performed, for example, as a result of having received a request that is serviceable by the application for which the application image was created. At some point after instantiation of the request instance, the application code of the application image is executed and execution may include an attempt to access the request for processing the request. Accordingly, the process 700 may include detecting 804 the application code's attempt to access the request (i.e., an attempt by a computer system executing the application code). As a result of detecting 804 the attempt to access the request, a worker controller may locate 806 (e.g., access from memory, perhaps selecting from multiple work tokens being stored) the corresponding work token associated with the request instance. The worker controller may then use the located work token to establish 808 a connection between the request, being stored by a frontend listener, and the work token. The connection may be established, for instance, at least in part by storing in memory an association between the work token and the request.

Once the connection has been established 808, the process 800 may include using 810 the token to locate the request and providing 812 data to the request instance. For example, the frontend listener may be listening (i.e., monitoring) for work connection requests from the worker controller and, when such a work connection request is received, may locate the received request based on the token provided from the worker controller and/or information derived therefrom. The frontend listener may duplicate a socket handle used to receive the received request and may give the duplicated socket handle to the listener listening for work connection requests. The listener listening for work connection requests may read and write data using the duplicated socket in accordance with the request instance. Once the data has been provided 812 to the request instance, a response may be received 814 from the request instance, such as described in more detail below. The response may then be provided 816 to the requestor (i.e., the computer system whose request triggered performance of the process 800).

As noted elsewhere herein, numerous variations of the embodiments explicitly described herein are considered as being within the scope of the present disclosure. For example, the above illustrates embodiments where a worker controller determines and obtains application images appropriate for instantiating virtual computer systems for processing requests. Other entities in various computing environments may perform such functionality. For example, the frontend listener or another system may determine which application image to access and provide information identifying the image or a location where the image can be found (e.g., by a URI). Similarly, the frontend controller may itself obtain the application image and transfer the application image to the worker controller. Further, the above embodiments include those where tokens are enqueued into a request queue that is processed by a worker controller. Generally, a frontend listener can notify a worker controller in a variety of ways, such as by pushing notifications to the worker controller that cause the worker controller to process logic that enables the request instance to obtain the request. Other variations are also considered as being within the scope of the present disclosure.

Figure 9:
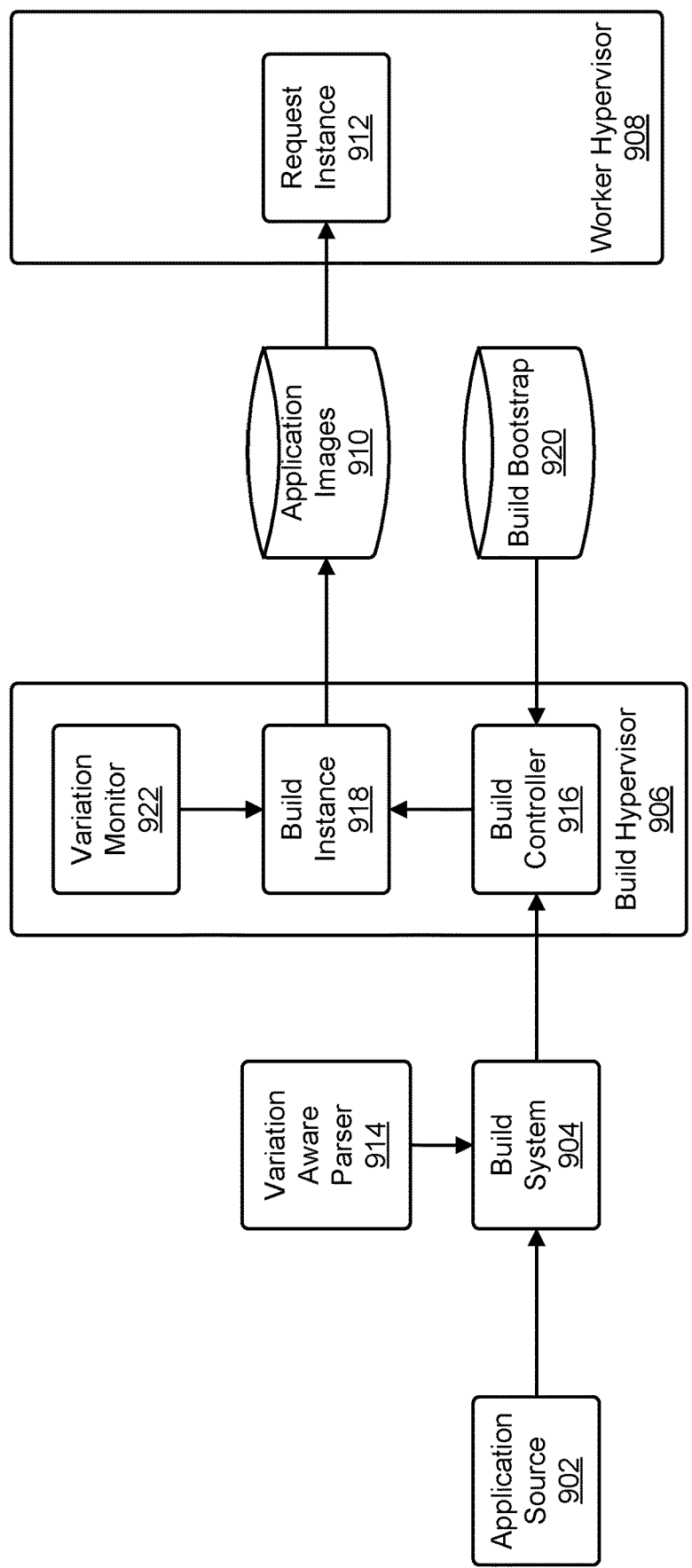
FIG. 9 shows an illustrative example of an environment in which various embodiments can be implemented.

As discussed above, application images are generated to be able to instantiate virtual computer systems (request instances) for the purposes of servicing received requests. Various techniques of the present disclosure relate to the generation of such application images to enable efficient instantiation to provide lower latency responding to request while utilizing lower amounts of computing resources. FIG. 9, accordingly, shows an illustrative example of an environment 900 in which various embodiments of the present disclosure may be practiced. In the example environment 900 of FIG. 9, an application source 902, build system 904, build hypervisor 906, and worker hypervisor 908. The application source may be provided by any system or component thereof that provides application code to be used in building an application image. The application code may have been received by a developer, such as a developer of a customer of a computing resource service provider or, generally, any developer able to contribute application code for the purpose of building application instances. The application source may be submitted by a developer through, for example, a web service application programming interface (API) or a version control system. The application source may include source files, configuration files, resource files (such as web pages, images, or other media files), binary files and/or the like.

The build system 904 may be a system or component thereof configured, as described in more detail below, to operate as a pre-processor for application code before it is processed into an application image, and placed into an application image repository 910. The worker hypervisor may be a worker hypervisor such as described above, e.g., configured with one or more processes that access an application image from the application image repository 910 and use the accessed application image to instantiate a request instance 912 for processing a request. The various components of FIG. 9 may be implemented on separate physical computer systems, although various embodiments of the present disclosure include embodiments where the same physical computer system implements both the build hypervisor 906 and the worker hypervisor 908, such as with an additional layer of virtualization.

In an embodiment, the build system 904 is configured to process application source using a variation aware parser 914 to produce an annotated source. The variation aware parser may be a system or component thereof (e.g., process executing on a system) configured to examine an executable portion of the application source (e.g., source code and/or compiled source code) to determine one or more locations (variation points) at which execution may first begin to vary in the program. Examples of variation may include execution reliant on receipt of a network message, reading user input, reading the system clock, utilization of a random number generator and/or performing other similar actions that may result in accessing information not deterministically derivable from the application source. In other words, a variation point may correspond to one or more computer executable instructions whose results of execution potentially varies among multiple executions. A catalogue of functions whose invocation can cause a variation in application execution may be maintained to enable the variation aware parser to identify locations in the execution where execution may begin to vary.

The variation aware parser 914 may also be configured to place annotations in the application source or may store annotations in metadata associated with the application source to record the one or more determined locations. In some embodiments, the variation aware parser is configured to apply static analysis of the program's structure to first identify one or more entry points for executing the application source. The variation aware parser 914 may, for instance, parse, interpret, or otherwise analyze the application source beginning from the one or more entry points until a potential variation is detected. The variation aware parser 914 may store the determined variation locations by, for example, recording a list of the lines of source code or executable machine instructions corresponding to the determined locations. In some embodiments, the variation aware parser is configured to interact with annotations placed by the developer in the application source. For example, the variation aware parser may read and process annotations that override whether a program location should or should not be considered a variation. Such developer annotations may be in accordance with a syntax that the variation aware parser 914 is configured to process.

In some embodiments, the build system is configured to transmit the annotated application source to a build controller 916 implemented by the build hypervisor 906, where the build controller 916 may be a process being executed on the build hypervisor 906. In an embodiment, the build system 904 selects the build hypervisor from among a plurality of hypervisors ready to receive build requests. The build system 904 may package the annotated source in an archive format and store the archive in a location available to the build controller. The build system 904 may communicate with the build controller 916 to initiate an application build, such as by making a web service request to the build controller, including the archive location, to initiate the build request.

In an embodiment, the build controller 916 is configured to access a build bootstrap program. The build bootstrap program may be stored in a repository 920 of bootstrap programs, which may be on the same physical computer system as the build hypervisor 906 or may be in another location within a distributed system and, as a result, accessible over a network. The build controller may analyze the annotated source to determine an appropriate bootstrap program for the application. For example, the build controller may analyze the annotated source for platform requirements or other factors that may influence the selection of a bootstrap program. There may be different bootstrap programs for different application types. There may be a bootstrap program for JavaScript applications, another bootstrap program for Ruby applications, and so on. Further, each type of application (JavaScript, Ruby, etc.) may have multiple bootstrap programs from which to select, each of which may be appropriate for one or more particular sub-types of applications. In some embodiments bootstrap programs are each configured to boot a kernel for the annotated source. The bootstrap program may, when executed, operate in accordance with routines to read the kernel and annotated source into memory. The bootstrap program may also include routines to set breakpoints at the determined variation locations in the annotated source. The bootstrap program may further include routines to begin executing the kernel from a kernel entry point.

In an embodiment, the build controller 916 creates a build instance 918 based on the annotated source and build bootstrap program. The build controller may, for instance, instantiate a virtual machine from which the annotated source and bootstrap program may be accessible. The build controller may attach to the build instance a variation monitor 922 operable to detect and respond to variation events to the virtual machine. The variation monitor 922 may be a process executed on the hypervisor 906 configured to analyze execution of the application and detect variation events. The build controller may also be configured to instruct the instantiated virtual machine to execute the bootstrap program. Upon execution of the bootstrap program, the variation monitor 922 may be configured to halt the build instance in response to the build instance reaching a variation point in the application. For example, the variation monitor 922 may be implemented using a virtual machine breakpoint. To do this, the variation monitor 922 may be configured to receive notifications of reached breakpoints and halt the virtual machine in response to receiving a notification. The variation monitor 922 may utilize hypervisor functionality to instruct the hypervisor to suspend the program when the CPU is executing a particular code instruction or when another event indicating reaching a variation point is detected. As one example, the variation monitor may read instructions placed into the application source or memory pages that contain the application source to determine where the variation points are. When an instruction is encountered that would result in a variation, the variation monitor 922 may issue an interrupt whose value corresponds to halting the virtual machine executing the application code. The hypervisor may trap the interrupt and an interrupt handler of the build instance's CPU may cause execution of the application to stop.

A second approach to that is to use the break point instruction which is an interrupt instruction used by systems employing an Intel Architecture. As part of the bootstrap, an interrupt handler may be installed to detect the interrupts (e.g., an interrupt with value 3 or, generally, a numerical value for interrupts corresponding to a need to halt execution). Upon detection of an interrupt, interrupt handler code may be executed in response to that interrupt being raised within the virtual machine. As part of the interrupt handler, a communication may be provided to the variation monitor that indicates the trapped instruction, thereby indicating a need to cease execution of the virtual machine. In other words, in this approach, control is first transferred to another piece of code running inside the build instance, but then upon communication with the variation monitor, the machine down is shut down so that a snapshot can be taken.

As part of the build process, the build controller may be configured to take a snapshot image of the build instance that has been halted. The build controller may, for instance, make a copy of the memory space of the virtual machine including the state of processor registers, flags, program counters, and other aspects of the virtual environment. The snapshot image may include an entry point address at which execution of the snapshot image may be resumed. In some embodiments the build controller may be configured to move execution of the build instance to a nearby execution safe point. For example, the build controller may advance or regress the machine instruction pointer to avoid snapshotting the image while executing certain kernel routines, critical sections or other unsafe portions of execution. The build controller may move the build instance to a nearby state at which some or all of the processor registers do not need to be restored to resume execution. A snapshot may be taken by the build controller 916 once the build instance has been moved to an execution safe point.

As noted above, an application image built in this manner may be utilized to instantiate a request instance (or, generally, any instance that is based at least in part on the application image). In some embodiments, the build controller 916 is configured to place the snapshot image in a repository of application images accessible by one or more worker hypervisors. A worker hypervisor may construct a request instance based on the snapshot image by retrieving an application image from the repository of application images and resume execution of the application at the entry point address.

Figure 10:
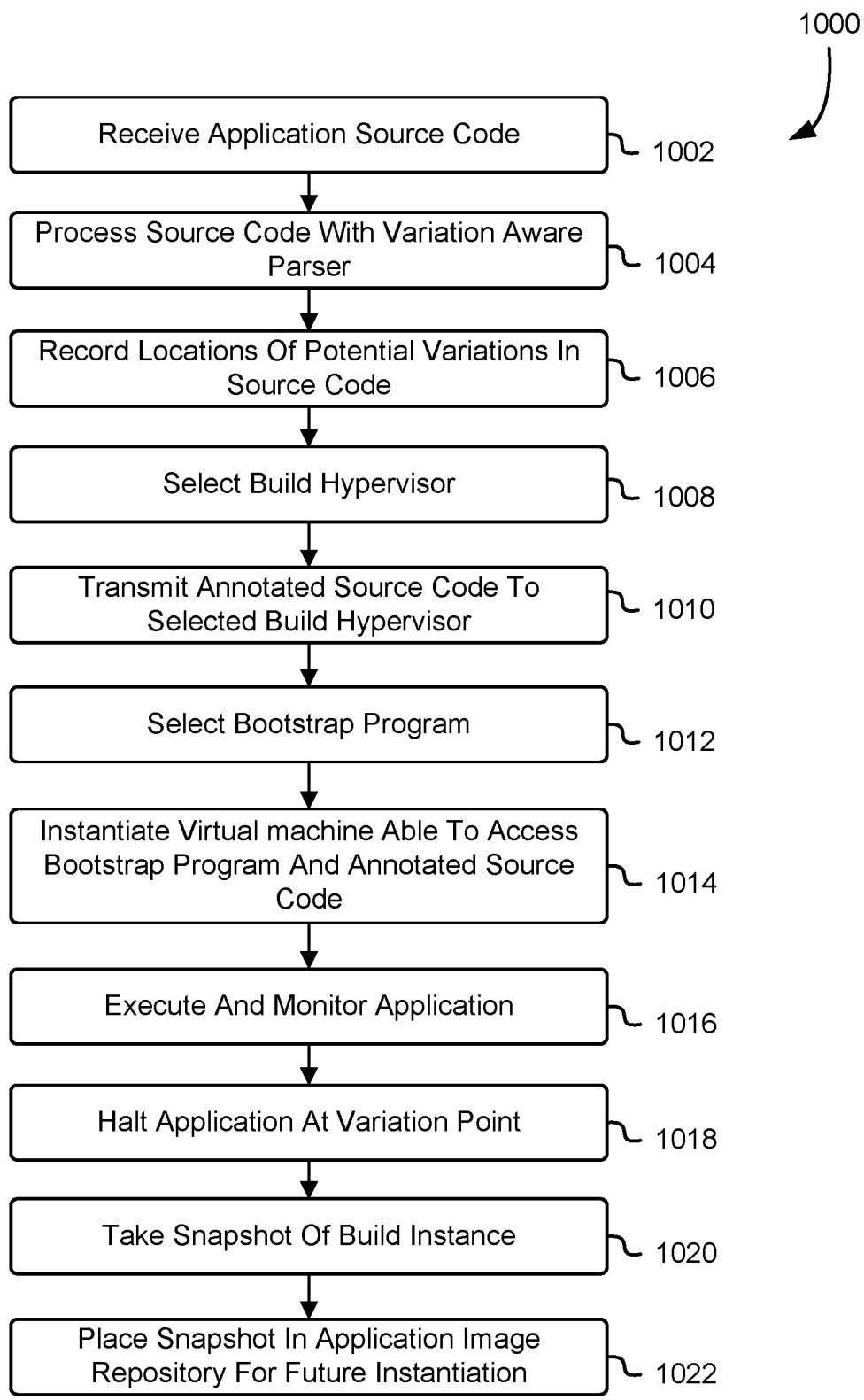
FIG. 10 shows an illustrative example of a process for building an application image in accordance with at least one embodiment.

FIG. 10 shows an illustrative example of a process 1000 for building an application image that may be used for various purposes, such as for instantiating request instances or other instances. Operations of the process 1000 may be performed by any suitable system, such as by a build system and/or build hypervisor, such as described above in connection with FIG. 9 and as described in more detail below. In an embodiment, the process 1000 includes receiving 1002 application source code, such as described above. For instance, the application source code may be received from a developer that developed the source code. A variation aware parser may be used to process 1004 the received application source code and potential variations in program execution may be determined and recorded 1006. For instance, as discussed above, a build system may cause the variation aware parser to examine an executable portion of the application source to determine one or more locations at which execution may first begin to vary in the program and place annotations in the application source. Alternatively or in addition, annotations may be stored in metadata associated with the application source to record the one or more determined locations. Determining the potential variations may include identifying one or more entry points for executing the application source and parsing, interpreting or otherwise analyzing the application source beginning from the one or more entry points until a potential variation is detected. Further, as noted, the variation aware parser may interact with annotations placed by the developer in the application source, for instance, to determine whether any annotations override whether a program location should or should not be considered a variation. The determined potential variation locations may be stored in any suitable manner, such as by recording a list of the lines of source code or executable machine instructions corresponding to the determined locations.

As illustrated in FIG. 10, the process 1000 may include selecting 1008 a build hypervisor. A build hypervisor may, for instance, be selected based at least in part on its availability for generating application boot images. A build hypervisor may also be selected based at least in part on one or more other factors, such as having a configuration suitable for building applications of a particular type (e.g., JavaScript or Ruby). Once selected, the annotated application source may be transmitted 1010 to the selected build hypervisor for processing. For instance, if the application source is annotated on a different system than the system that operates the build hypervisor, the annotated application source may be transmitted over a network to the build hypervisor. A bootstrap program may also be selected 1012. As discussed, different types of applications may correspond to different bootstrap programs. For example, a particular bootstrap program may be configured for a particular application type. In alternate embodiments, however, bootstrap programs may be configured to be more complex, such as by having the ability be used for multiple application types. In various embodiments, a bootstrap program is configured to boot a kernel for the annotated source. The bootstrap program may, for instance, include routines to read the kernel and annotated source into memory. The bootstrap program may include routines to set breakpoints at the determined variation locations in the annotated source. The bootstrap program may also include routines to begin executing the kernel from a kernel entry point.

In an embodiment, the process 1000 includes instantiating 1014 a virtual machine able to access both the bootstrap program and the annotated source code. The virtual machine may, for instance, be instantiated under the direction of the build controller discussed above. The build controller may also attach to the instantiated virtual machine a variation monitor that is operable to detect and respond to variation events to the virtual machine. The build controller may instruct the instantiated virtual machine to execute the bootstrap program. The application may then be executed and monitored 1016 by the variation monitor which may halt 1018 the build instance in response to the build instance reaching a variation point in the application. For example, the variation monitor may be implemented using a virtual machine breakpoint. The variation monitor may be configured to receive notifications of reached breakpoints and halt the virtual machine in response to receiving a notification. A snapshot of the build instance may be taken 1020. In an embodiment, taking the snapshot 1020 includes the build controller making a copy of the memory space of the virtual machine, including the state of processor registers, flags, program counters, and other aspects of the virtual environment. The snapshot image may include an entry point address at which execution of the snapshot image should resume. As discussed below, taking the snapshot may also include moving the build instance to a nearby execution safe point. For example, the build controller may advance or regress a machine instruction pointer to avoid snapshotting the image while executing certain kernel routines, critical sections, or other unsafe portions of execution. The build controller may also move the build instance to a nearby state at which some or all of the processor registers do not need to be restored to resume execution.

In an embodiment, the process 1000 includes storing the snapshot in a location where the snapshot can be used at a later time to instantiate a request instance or another instance. Accordingly, as illustrated in FIG. 10, the process 1000 includes placing 1022 the snapshot in an application image repository so that the snapshot may be used at a later time, such as to instantiate a request instance as described below.

As with all techniques disclosed explicitly herein, variations are considered as being within the scope of the present disclosure. For example, variations in determining when to snapshot a build instance and/or which snapshot to use may be used so that snapshots that are used for instantiation of an instance are reliable and instantiable without processing that may be unnecessary with proper setup.

Figure 11:
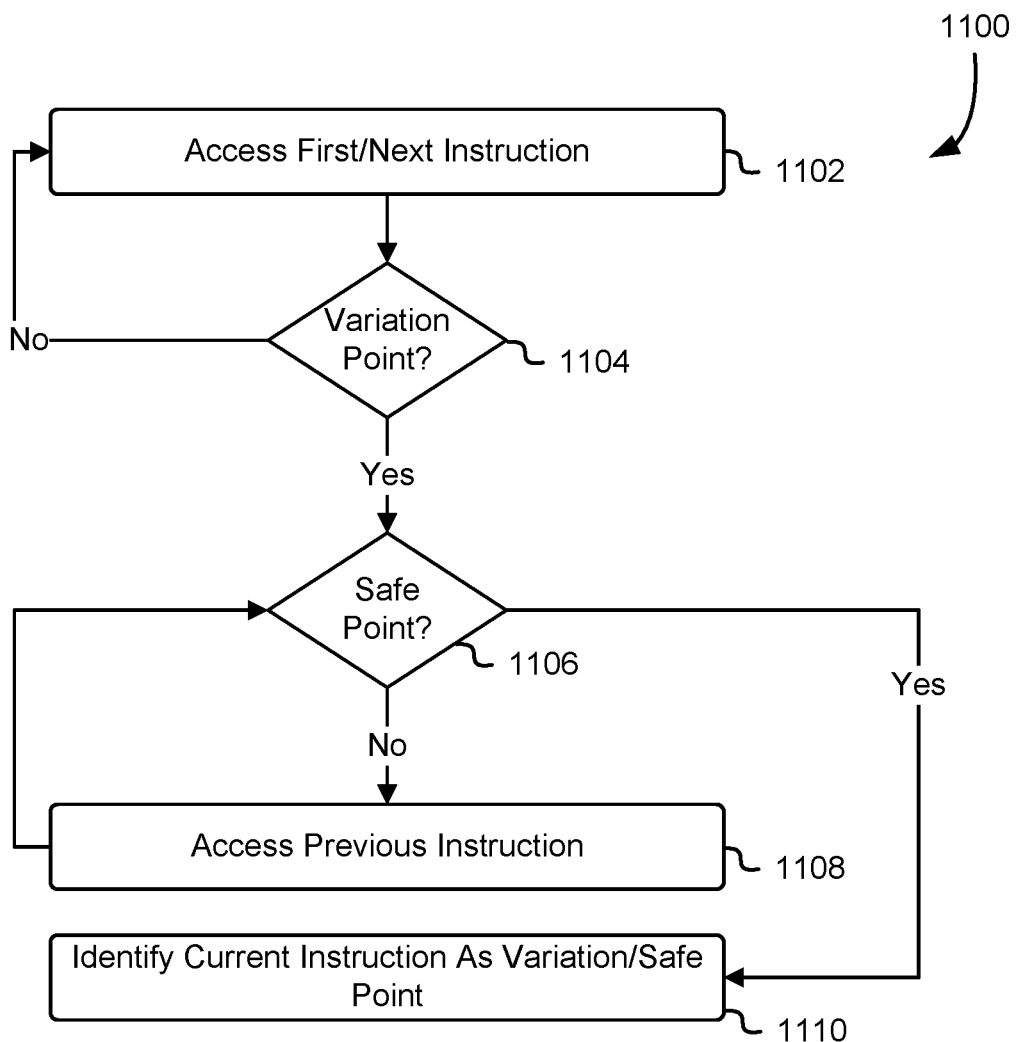
FIG. 11 shows an illustrative example of a process for identifying a safe point in application code execution in accordance with at least one embodiment.

In some embodiments, safe points in an application execution are identified by a variation aware parser, such as described above. FIG. 11, accordingly, shows an illustrative example of a process 1100 which may be used to determine a safe point for taking a snapshot. The process 1100 may be performed by any suitable system, such as a variation aware parser or another system having such functionality. In an embodiment, the process 1100 includes accessing 1102 a first instruction and determining 1104 whether the instruction corresponds to a variation point. Determining 1104 whether the instruction corresponds to a variation point may be performed, for example, as described above. If determined 1104 that the current instruction does not correspond to a variation point, the process 1100 may repeat the operations of accessing 1102 the next instruction and determining whether the accessed instruction corresponds to a variation point. This may repeat until determined 1104 that the currently accessed instruction corresponds to a variation point.

When determined 1104 that the currently accessed instruction corresponds to a variation point, the process 1100 may include determining 1106 whether the currently accessed instruction corresponds to a safe point. Determining 1106 whether the currently accessed instruction corresponds to a safe point may be performed in any suitable manner. For example, in some embodiments, the currently accessed instruction is analyzed to determine any functions connected with the instruction and checking whether any determined functions appear in a catalogue of functions that are identified as unsafe (e.g., because invocation of such functions can result in machine interrupts being set at a particular state or because invocation of the functions corresponds to activity that is not able to be reconstructed in a suspend and resume process).

If determined 1106 that the currently accessed instruction does not correspond to a safe point, the process 1100 may include accessing 1108 a previous instruction (e.g., the immediately prior instruction in a sequence of instructions). A determination may be made 1106 again whether the currently accessed instruction corresponds to a safe point. This process may repeat by successively accessing previous instructions and determining whether they correspond to safe points until a determination is made 1106 that the currently accessed instruction corresponds to a safe point. When determined 1106 that the currently accessed instruction corresponds to a safe point, the process 1100 may include identifying 1110 the current instruction as a variation point and safe point so that, when processed by a variation monitor (or other suitable system), execution of the application is halted at the identified point. In this manner, a safe point is identified as a variation point for later processing instead of the actual point of variation which may not be a safe point.

Figure 12:
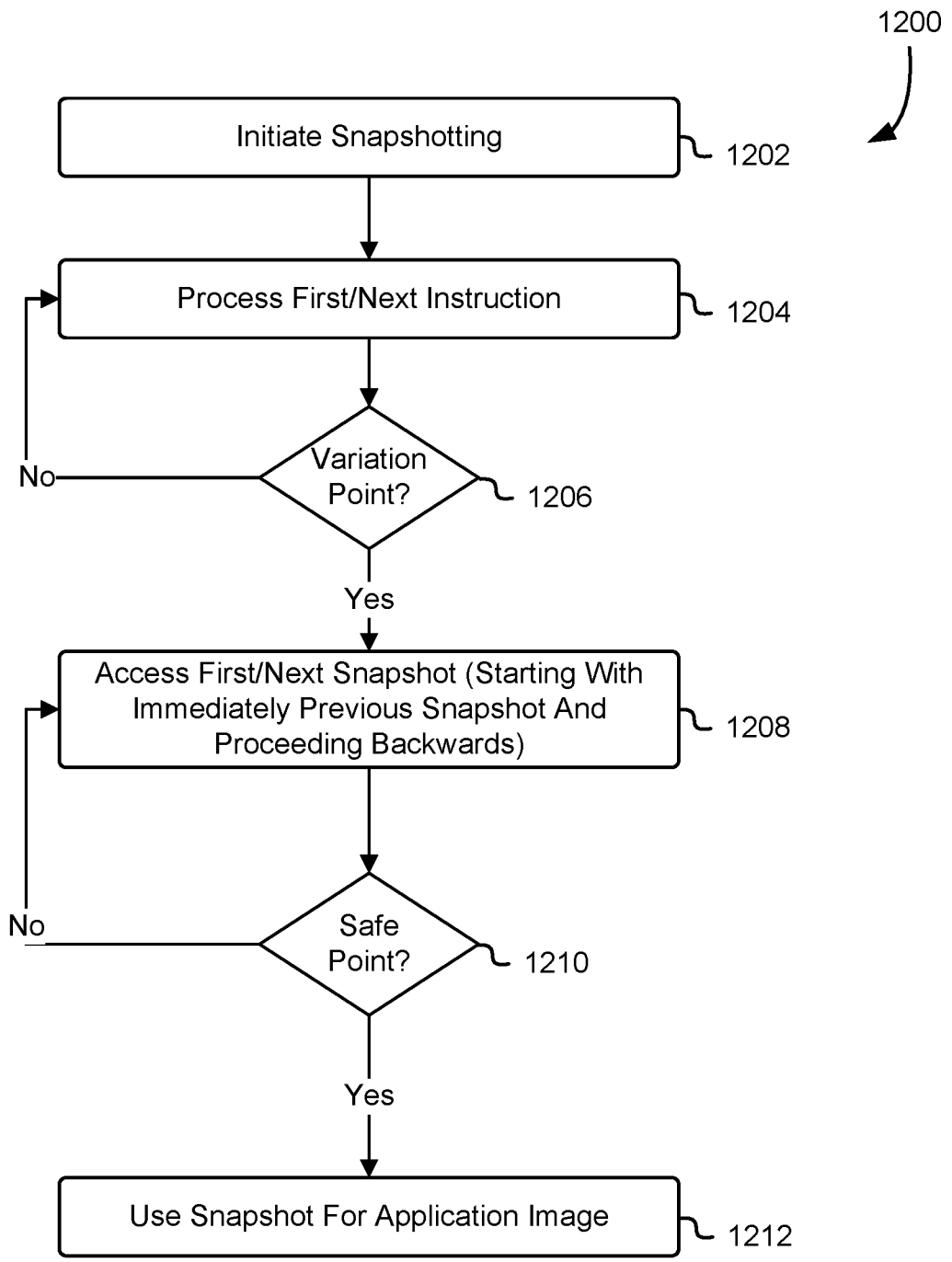
FIG. 12 shows an illustrative example of a process for identifying a safe point in application code execution in accordance with at least one embodiment.

FIG. 12 shows an alternate process of determining a safe point usable for constructing an application image. The process 1200 may be performed to compute safe points dynamically as part of a build instance. The process 1200 may be performed by any suitable system, such as a variation monitor such as described above or other such system. In the process 1200, snapshotting may be initiated 1202 so that snapshots are taken multiple times during execution of the application code by the build instance. Initiating the snapshotting may be performed, for example, so that snapshots are taken periodically, such as every microsecond (or other amount of time) and/or with execution of every instruction.

In an embodiment, the process 1200 includes processing 1204 the first/next instruction, where processing may include executing the instruction and/or analyzing the instruction as it is processed. A determination may be made 1206 whether the instruction corresponds to a variation point, such as described above. If determined 1206 that the instruction does not correspond to a variation point, the process 1200 may repeat by processing the next instruction until determined 1206 that the currently processed instruction corresponds to a variation point. When determined 1206 that a current instruction corresponds to a variation point, the process 1200 may include accessing 1208 the first snapshot in a sequence of snapshots proceeding backwards in time. The first snapshot may be, for instance, the most recent snapshot taken before the instruction corresponding to the variation point was encountered.

A determination may be made 1210 whether the snapshot corresponds to a safe point. The determination 1210 may be made based at least in part on an analysis of the snapshot. A set of safe point criteria may be checked and compliance with the criteria may indicate that the snapshot corresponds to a safe point. The criteria may be based at least in part on a state of the CPU. For example, criteria based at least in part on the CPU register state may include whether an interrupt flag is clear or set, whether the CPU is handling an exception, whether the CPU is in the middle of a page fault and, generally, whether the CPU register is reproducible. The criteria may also be based at least in part on whether the CPU is at an unsafe point caused by the application code because, for instance, the application code has acquired a critical section lock, whether the CPU, as indicated by a CPU instruction pointer, is processing instructions marked as unsafe. If determined 1210 that the snapshot does not correspond to a safe point, the process 1200 may include repeatedly accessing 1208 the next (moving backwards in time) snapshot and determining 1210 whether the accessed snapshot corresponds to a safe point until determined 1210 that the currently accessed snapshot corresponds to a safe point. Any snapshots not identified as safe may be discarded, either upon determining that they do not correspond to a safe point, upon completion of the process 1200 or otherwise. When determined 1210 that a snapshot corresponds to a safe point, the snapshot may be used 1212 for an application image.

Generally, the above techniques provide techniques for computing that entry point, which is based at least in part on the position of the instruction pointer of the CPU at the time a snapshot was taken. This provides a place for resumption as part of booting the application image due to having available the exact state. Further, there may be additional bootstrap code that runs before jumping to that snapshot point and that could be for doing things such as restoring the values of CPU registers or other configuration information for the machine. For instance, when a machine boots up, its bootstrap program may reconstruct that exact state that corresponds to the snapshot image. Because a facility in a hypervisor may not make a perfect copy, but may have information about the state in memory, the bootstrap program can fix any improper state if the bootstrap program is provided with additional state information. The additional state may information may be accessible to the bootstrap program as metadata or supplementary application image. The bootstrap program may use the additional state information to restore application state before jumping into the entry point of the application.

Figure 13:
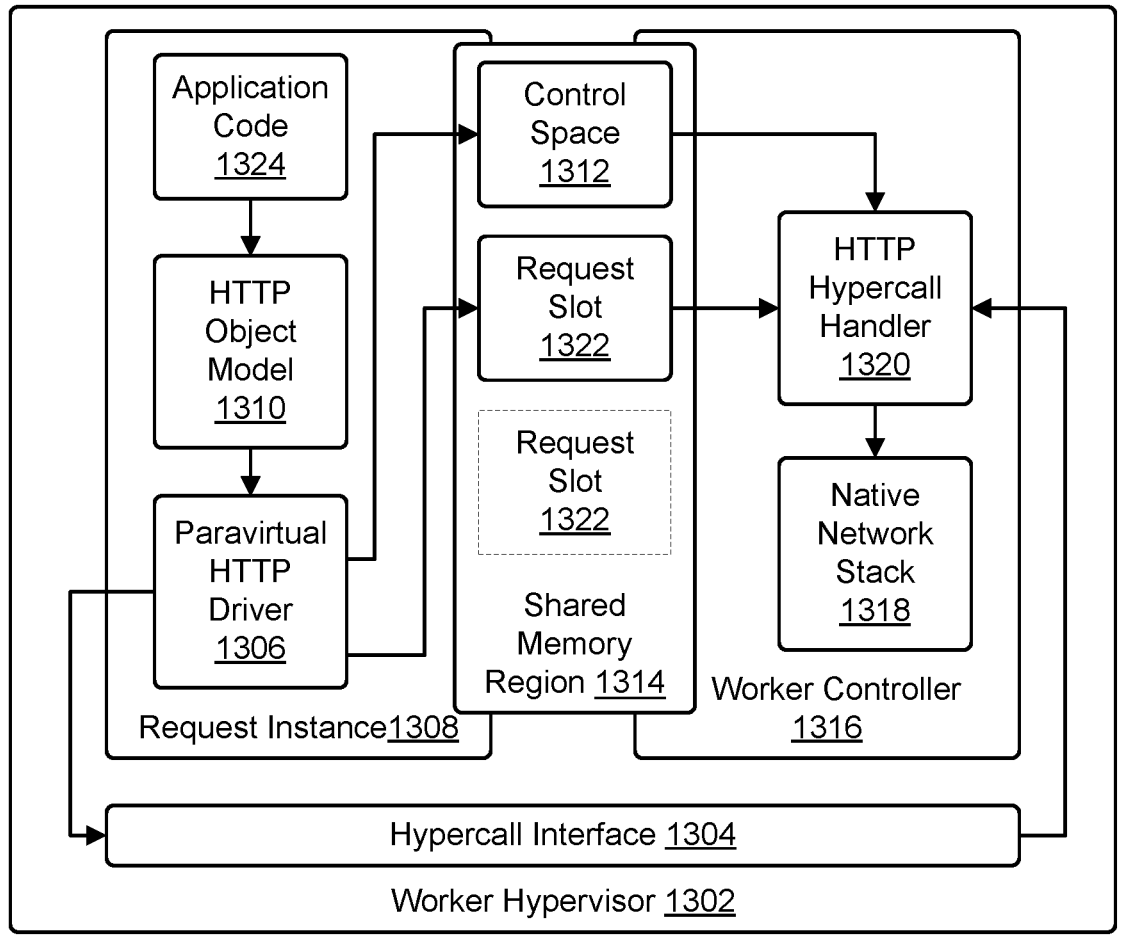
FIG. 13 shows an illustrative example of a worker hypervisor and components thereof in accordance with at least one embodiment.

As noted above, various embodiments of the present disclosure reduce the computational overhead required for an instance instantiated in accordance with the various techniques described herein. As a result, instance provisioning is able to proceed quickly and with minimal wasted resources. FIG. 13 shows an illustrative example of an environment which may enable an instance, such as a request instance, to process requests. As illustrated in FIG. 13, the environment is implemented inside of a worker hypervisor 1302, which may be a worker hypervisor, such as described above. The worker hypervisor 1302 may implement a hypercall interface 1304, which may be an interface that allows a guest operating system or guest application (e.g. request instance) to make requests to the hypervisor. The hypercall interface 1304 may be configured to receive hypercalls from a paravirtual hypertext transfer protocol (HTTP) driver 1306 in a request instance 1308 (or other instance which is not necessarily instantiated as a result of a received request that needs to be processed) implemented on the worker hypervisor 1302. The hypercall interface may provide hypercalls received from the paravirtual HTTP driver 1306 to an HTTP hypercall handler 1320. While HTTP is used throughout for the purpose of illustration, the various techniques described herein may be adapted to support other protocols which may be used by an instance.

The paravirtual HTTP driver 1306 may be configured to provide a system call interface for making HTTP requests similar to or in correspondence with the interface for making HTTP requests provided by an HTTP object model 1310. The HTTP object may translate the configured HTTP request to format the request configuration appropriately for the system call interface. The paravirtual HTTP driver 1306 may also be configured to create a request record in a control space 1312 within a memory region 1314 shared between the request instance 1308 and a worker controller 1316, which may be as described above (e.g., the worker controller described above in connection with FIG. 5). The control space 1312 may be a space reserved for storing information about data stored in request records of the shared memory region 1314. The paravirtual HTTP driver 1306, for instance, may be configured to write data to the control space 1312 that indicates where data of the request is located in the shared memory region 1314. Information may be included may comprise an identifier of the request slot, information that indicates the size of the data taken in the request slot, the size of the request slots (if an embodiment where the size may vary) and, generally, information that allows identification of the correct amount of data from the request slots.

The shared memory region may be implemented in various ways, such as a circular (ring) buffer. In various embodiments, each request instance implemented on the hypervisor is provided its own shared memory buffer, although the various embodiments described herein may be adapted so that multiple request instances share a memory buffer (e.g., by tracking additional information to be able to match requests to request instances). The HTTP driver may be configured with a memory location at which the control space is located. The HTTP driver may construct a request record within the control space based on configuration information from the HTTP request.

As illustrated in FIG. 13, the request instance may lack various resources necessary for processing some requests. For example, the processing of various requests may include use of a network stack (protocol stack), such as a transmission control protocol/Internet protocol (TCP/IP) stack or other network stack, where a network stack may be a program that implements a protocol suite. The request instance 1308 may lack a network stack so as to not require the overhead required to use the network stack. To process requests, however, the request instance may interact with a network stack 1318 implemented by the worker controller 1316. The worker controller 1316 may operate a single network stack that is used for multiple request instances implemented on the worker hypervisor 1302. Accordingly, the hypercall interface 1304 may be configured to process certain calls from the paravirtual HTTP driver 1306 to a HTTP hypercall handler 1320 that may be a process of the worker controller 1316 configured with programming logic for responding to hypercalls from the paravirtual HTTP driver 1306 through the hypercall interface 1304. The HTTP hypercall hander 1320 may be configured to direct communications involved in processing requests using the network stack 1318. As discussed in more detail below, the actual data for the request may be provided to the worker controller through the shared memory region 1314 using one or more request slots 1322 of the shared memory region 1314. For example, when application code 1324 is executed, data to and from the application may be transmitted via the shared memory region 1314. Data written to the control space 1312 by the paravirtual HTTP driver 1306 may indicate one or more request slots 1322 where data for the request can be located so that the HTTP hypercall handler 1320 can read the control space 1312 to determine which control slot(s) to obtain the data from. In this manner, the hypercall interface 1304 can be configured to handle small amounts of data (which is efficient due to the limited resources required to manage smaller amounts of data) while still allowing relevant data of a larger size to be passed from the request instance 1308 to the worker controller 1316.

Figure 14:
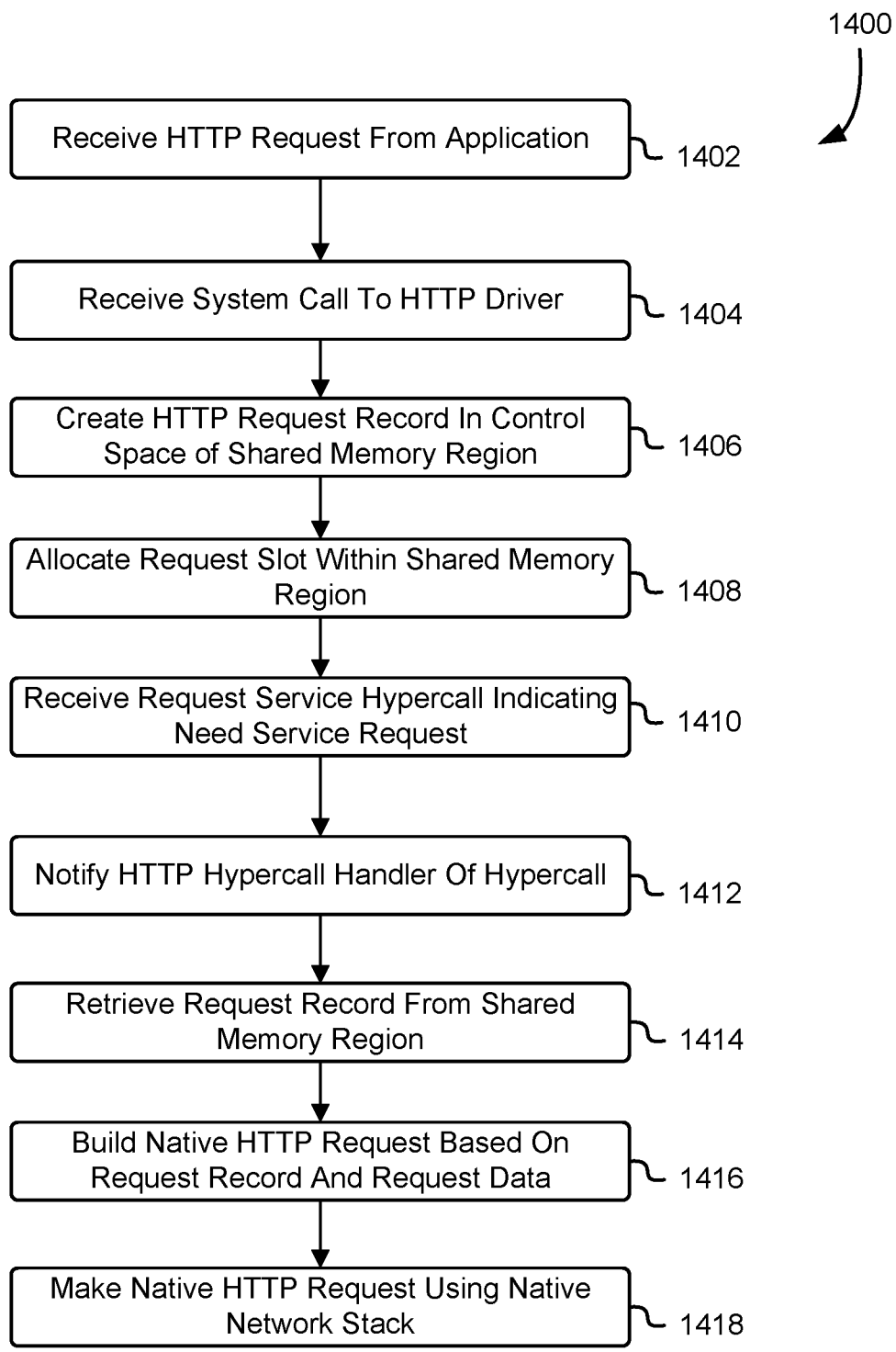
FIG. 14 shows an illustrative example of a process for processing a request in accordance with at least one embodiment.

FIG. 14 shows an illustrative example of a process 1400 for processing a request, in accordance with an embodiment. The process 1400 may be performed by a hypervisor (i.e., by a computer system in accordance with executable code for implementing a hypervisor), such as a worker hypervisor as described above. The process 1400 uses HTTP as an example, but as noted above, the process 1400 may be adapted for use with other protocols. In an embodiment, the process includes receiving 1402 an HTTP request from an application. The request may be made using an HTTP object model. Further, the application code may instantiate an appropriate HTTP request object for responding to the request. The request object may be, for instance, a JavaScript XmlHttpRequest object or a Node.js createServer object. Execution of the application code may configure the HTTP request with a location, parameters, data and/or the like.

With the HTTP object in place, the application code may utilize the HTTP object to make a system call to a paravirtual HTTP driver. Accordingly, the process 1400 may include receiving 1404 a system call to a paravirtual HTTP driver. For instance, the HTTP object may make a kernel system call to access the paravirtual HTTP driver which may provide a system call interface for making an HTTP request similar to or in correspondence with the interface for making HTTP requests provided by the HTTP object model. The HTTP object may translate the configured HTTP request to format the request configuration appropriately for the system call interface.

Upon receipt 1404 of the system call, the paravirtual HTTP driver may create a request record in a control space within a shared memory region, e.g., a memory region shared between a worker controller and a request instance, such as described above. The paravirtual HTTP driver may be configured with a memory location at which the control space is located. The paravirtual HTTP driver may create 1406 a request record within the control space based on configuration information from the HTTP request. In an embodiment, the paravirtual HTTP driver may determine a memory block size based on the HTTP request configuration. The HTTP driver may attempt to allocate a memory block from the control space based on the determined size and copy an HTTP request configuration to the allocated memory block. In some embodiments, the HTTP driver attaches a pointer to the allocated memory to a list of active HTTP request records using a lock-free compare-and-swap linked list implementation. The request record may include a sequence number, random value and/or other identifier suitable for uniquely identifying the request record. In some embodiments, the identifier may be operable to further correlate the request record with one or more of: the HTTP request, the HTTP request object or the application code making the HTTP request.

In an embodiment, the process 1400 includes allocating 1408 a request slot within the shared memory region that is associated with the request record. For example, in some embodiments, the shared memory region may include one or more fixed-size buffer regions organized using a ring buffer. The HTTP driver may allocate one of the buffer regions using mutual exclusion, such as by performing compare-and-swap assignment of a lease record. The HTTP driver may associate the request slot with the request record by setting fields in the request record to the address and size of the request slot. In one embodiment the one or more fixed-size buffer regions may comprise a plurality of buffer sizes, each buffer size corresponding to a list of one or more buffer regions of that size. For example, a first particular buffer size may be used for servicing receive requests and a second particular buffer size may be used for servicing send requests.

Under the direction of the HTTP object model, the paravirtual HTTP driver may make a request service hypercall using a hypercall interface. The HTTP driver may make a hypercall indicating that a request record needs to be serviced. The hypercall may include an identifier for the request record so that a hypercall handler can identify the request record in the shared memory region. Accordingly, the hypercall interface may receive 1410 the request and notify 1412 the HTTP hypercall handler of the hypercall, thereby indicating to the hypercall handler that the request needs servicing. In some embodiments, a worker controller implementing the HTTP hypercall handler is configured to receive notifications of relevant hypercalls, such as by subscribing to a hypercall event dispatcher. The worker controller may be configured to dispatch a received notification to a hypercall handler for servicing HTTP requests.

Upon receipt of the hypercall, the hypercall handler may retrieve 1414 the request record from the shared memory region (e.g., by using an identifier of the request record). For example, the hypercall handler may walk a linked list of active HTTP requests to find a request record whose identifier matches an identifier provided as a hypercall parameter. Once the HTTP hypercall handler retrieves 1414 the request record, the hypercall handler may build a native HTTP request based at least in part on the retrieved request record and request data located in the request slot associated with the request record. The hypercall handler may construct a second HTTP request using a second HTTP object model, such as an object model using a Portable Components (POCO) C++ library or the libcurl library. For example, the hypercall handler may build 1416 an HTTP request using the second HTTP object model and configure the HTTP request using a location, parameters, or other similar data included in the request record. The hypercall handler may access the request slot associated with the request record and construct an entity body or configure the HTTP request based on contents of the request slot.

With the HTTP request built 1416 by the hypercall handler, the HTTP hypercall handler may make 1418 the native HTTP request using a native network stack implemented by the worker controller. The hypercall handler may return data or results from the second HTTP request by updating the request record and associated request slot. In some embodiments, the HTTP driver waits on a semaphore included in the request record. The hypercall handler may update the request record and contents of the request slot based on the second HTTP request. The hypercall handler may signal the semaphore when updates have been completed. The HTTP driver may reset and wait again on the semaphore once the update has been processed, such as if the update represents a portion of an HTTP response stream. Alternatively, the HTTP driver may make a new hypercall request once the update has been processed to request further updates.

As an illustrative example of how the process 1400 may be used, the HTTP hypercall handler, upon notification of such a request from the hypercall interface, may create an HTTP listener on the native network stack. The HTTP listener may wait for an inbound HTTP request and, when data received for the inbound request is received, the HTTP hypercall handler may use the shared memory to marshal data to the request instance. The HTTP hypercall handler may, for instance, notify the paravirtual HTTP driver of the received data which may then obtain the data from the shared memory, such as by using information written by the HTTP hypercall handler to a control space to locate one or more request slots in which the data is contained. The data may then be provided to the application code for any processing that may occur.

The process 1400 may be adapted for processing various types of requests. For example, for streaming data, the first chunk of received data may be processed such as described above. A similar process may occur, where communications through the hypercall handler indicate a need to receive additional data for an existing request. The data may be passed through the shared memory, such as described above. Similarly, for sending data, a notification may be sent through a hypercall handler that data is to be sent. The worker controller, upon receipt of the notification, may obtain data placed by the instance into the shared memory, build a native HTTP request, and transmit the data.

Figure 15:
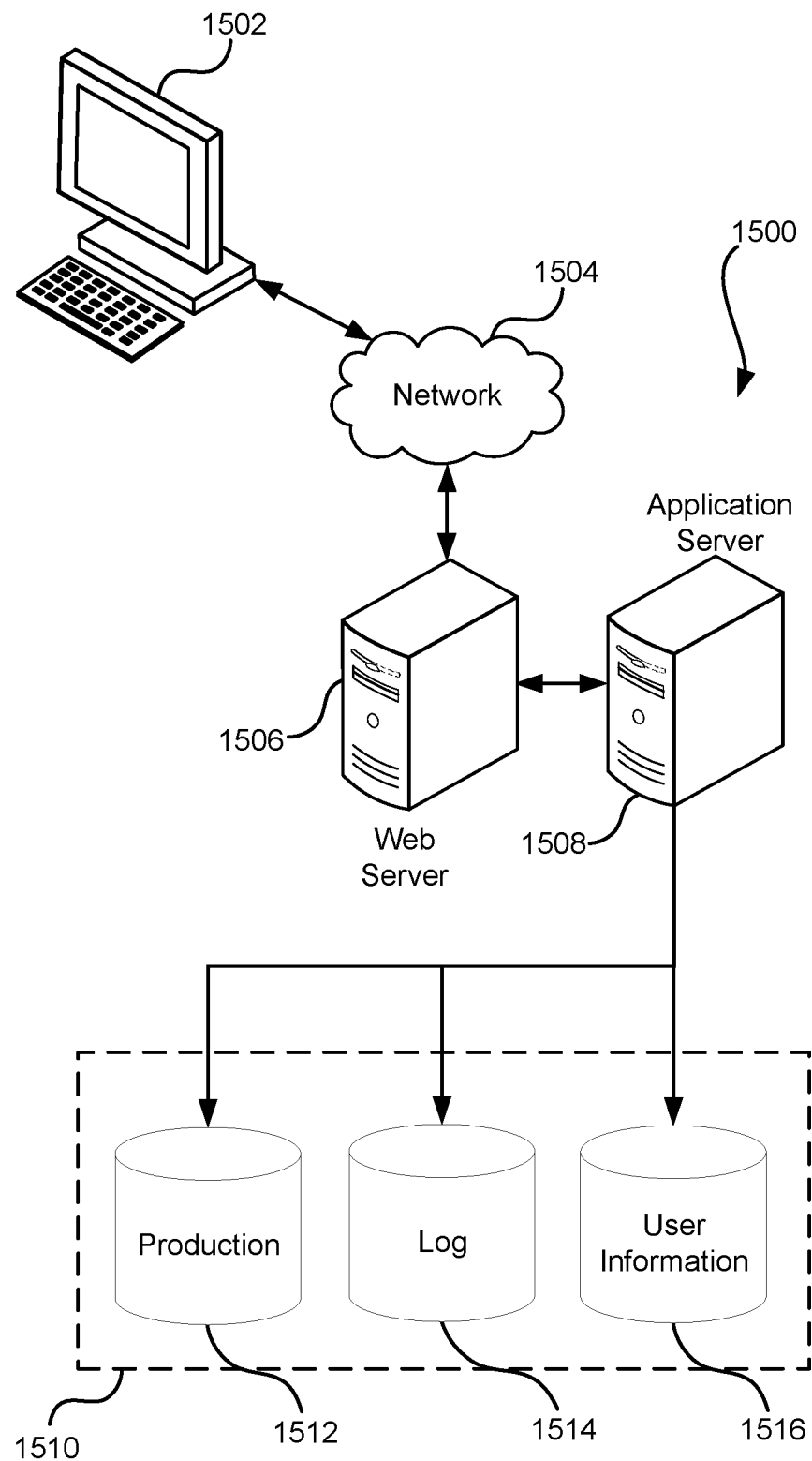
FIG. 15 illustrates an environment in which various embodiments can be implemented.

FIG. 15 illustrates aspects of an example environment 1500 for implementing aspects in accordance with various embodiments. As will be appreciated, although a web-based environment is used for purposes of explanation, different environments may be used, as appropriate, to implement various embodiments. The environment includes an electronic client device 1502, which can include any appropriate device operable to send and receive requests, messages or information over an appropriate network 1504 and convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1506 for receiving requests and serving content in response thereto, although for other networks an alternative device serving a similar purpose could be used as would be apparent to one of ordinary skill in the art.

The illustrative environment includes at least one application server 1508 and a data store 1510. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling some (even a majority) of the data access and business logic for an application. The application server may provide access control services in cooperation with the data store and is able to generate content such as text, graphics, audio and/or video to be transferred to the user, which may be served to the user by the web server in the form of HyperText Markup Language ("HTML"), Extensible Markup Language ("XML") or another appropriate structured language in this example. The handling of all requests and responses, as well as the delivery of content between the client device 1502 and the application server 1508, can be handled by the web server. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed system.

The data store 1510 can include several separate data tables, databases or other data storage mechanisms and media for storing data relating to a particular aspect of the present disclosure. For example, the data store illustrated may include mechanisms for storing production data 1512 and user information 1516, which can be used to serve content for the production side. The data store also is shown to include a mechanism for storing log data 1514, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1510. The data store 1510 is operable, through logic associated therewith, to receive instructions from the application server 1508 and obtain, update or otherwise process data in response thereto. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1502. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 15. Thus, the depiction of the system 1500 in FIG. 15 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers and business application servers. The server(s) also may be capable of executing programs or scripts in response requests from user devices, such as by executing one or more web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members used in the above conjunctive phrase, "at least one of A, B, and C" and "at least one of A, B and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C to each be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
identifying a portion of an application to execute;
identifying, in the portion, a first execution point by at least indicating, in source code of the application, a location of the first execution point;
determining, based at least in part on the source code and the location indicated, a different second execution point that avoids an unsafe portion of execution in the application; and
causing execution of the portion from the different second execution point.

2. The computer-implemented method of claim 1, further comprising monitoring execution of the application to determine the first execution point.

3. The computer-implemented method of claim 1, further comprising generating a snapshot of the portion prior to identifying the first execution point.

4. The computer-implemented method of claim 1, wherein the first execution point is a variation point at which execution of the portion diverges.

5. The computer-implemented method of claim 1, wherein the different second execution point is a halting point at which the portion was suspended prior to identifying the first execution point.

6. The computer-implemented method of claim 1, wherein:
the first execution point is a variation point at which execution is variable between different executions of the application; and
the different second execution point corresponds to a starting point for resuming execution of the application relative to the variation point.

7. The computer-implemented method of claim 1, wherein the different second execution point precedes the first execution point.

8. A system, comprising:
one or more processors; and
memory to store executable instructions that, upon execution by the one or more processors, cause the system to:
identify a portion of an application to execute;
identify, in the portion, a first execution point by at least indicating, in source code of the application, a location of the first execution point;
determine, based at least in part on the source code and the location indicated, a different second execution point that avoids an unsafe portion of execution in the application; and
cause execution of the portion from the different second execution point.

9. The system of claim 8, wherein the instructions, upon execution, further cause the system to cause execution of the portion from the different second execution point using a different virtual machine instance than a first virtual machine instance in which the portion was identified.

10. The system of claim 8, wherein:
source code associated with the application includes an annotation indicating a potential point for halting execution of the portion; and
the first execution point is identified based at least in part on the annotation.

11. The system of claim 8, wherein the executable instructions, if executed, further cause the system to instantiate a virtual machine instance to cause execution of the portion.

12. The system of claim 8, wherein the instructions, upon execution, further cause the system to generate a snapshot of the portion as a result of identifying the portion.

13. The system of claim 8, wherein the portion is an executable portion of the application.

14. The system of claim 8, wherein the first execution point is a variation point at which execution of the portion diverges.

15. A non-transitory computer-readable storage medium storing instructions that, upon execution by one or more processors of a computer system, cause the computer system to at least:
identify a portion of an application to execute;
identify, in the portion, a first execution point at least by indicating, in source code of the application, a location of the first execution point; and
cause execution of the portion from a different second execution point that avoids an unsafe portion of execution in the application, the different second execution point based at least in part on the source code and the indicated location of the first execution point.

16. The non-transitory computer-readable storage medium of claim 15, wherein the instructions, upon execution, further cause the computer system to instantiate a computer system instance to execute the application for identifying the portion.

17. The non-transitory computer-readable storage medium of claim 15, wherein the instructions, upon execution, further cause the computer system to generate an application image of the portion.

18. The non-transitory computer-readable storage medium of claim 17, wherein the instructions that cause the computer system to cause the application image to be stored further cause the computer system to provide the application image to a different computer system.

19. The non-transitory computer-readable storage medium of claim 15, wherein the portion is identified as a result of monitoring an execution of the application.

20. The non-transitory computer-readable storage medium of claim 15, wherein the instructions, upon execution, further cause the computer system to process source code associated with the portion to identify the first execution point.

21. The non-transitory computer-readable storage medium of claim 20, wherein the first execution point is a point of the portion at which execution of the portion beyond the point is non-deterministic.

* * * * *